(12) United States Patent
Kairali et al.

(10) Patent No.: US 11,522,948 B1
(45) Date of Patent: Dec. 6, 2022

(54) DYNAMIC HANDLING OF SERVICE MESH LOADS USING SLICED REPLICAS AND CLOUD FUNCTIONS

(71) Applicant: International Business Machines Corporation, Armonk, NY (US)

(72) Inventors: Sudheesh S. Kairali, Kozhikode (IN); Sarbajit K. Rakshit, Kolkata (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/592,972

(22) Filed: Feb. 4, 2022

(51) Int. Cl.
| | |
|---|---|
| *H04L 67/1008* | (2022.01) |
| *H04L 45/42* | (2022.01) |
| *H04L 67/1012* | (2022.01) |
| *H04L 67/1014* | (2022.01) |

(52) U.S. Cl.
CPC .......... *H04L 67/1008* (2013.01); *H04L 45/42* (2013.01); *H04L 67/1012* (2013.01); *H04L 67/1014* (2013.01)

(58) Field of Classification Search
None
See application file for complete search history.

(56) References Cited

U.S. PATENT DOCUMENTS

| | | | | |
|---|---|---|---|---|
| 9,026,655 | B2 * | 5/2015 | Duvur | H04L 67/1025 709/241 |
| 10,409,649 | B1 * | 9/2019 | Young | G06F 9/5083 |
| 10,574,699 | B1 * | 2/2020 | Baer | G06F 21/6218 |
| 10,817,506 | B2 * | 10/2020 | Shukla | G06F 16/2272 |
| 10,834,189 | B1 * | 11/2020 | Chopra | H04L 67/1012 |
| 10,877,684 | B2 * | 12/2020 | Patel | G06F 3/0644 |
| 11,012,520 | B2 | 5/2021 | Gunjal | |
| 11,169,835 | B1 * | 11/2021 | Duong | G06F 9/4856 |
| 11,392,622 | B2 * | 7/2022 | Shivashankara | G06F 16/285 |
| 2005/0055435 | A1 * | 3/2005 | Gbadegesin | H04L 67/1008 709/224 |

(Continued)

OTHER PUBLICATIONS

Mell et al., "The NIST Definition of Cloud Computing", Recommendations of the National Institute of Standards and Technology, Special Publication 800-145, Sep. 2011, 7 pages.

*Primary Examiner* — Backhean Tiv
(74) *Attorney, Agent, or Firm* — Christopher M. Pignato

(57) ABSTRACT

Systems, methods and/or computer program products managing momentary increases in resource requirements of microservices within a service mesh using sliced replicas or pre-configured cloud functions. The service mesh tracks incoming API calls of applications requesting use of specific microservice capabilities. Over time capabilities being called are categorized by the service mesh based on call frequency. Service mesh predicts patterns of expected increases in requests for each capability of the microservices. As the increase in the number of API calls for the capability become more than a threshold level predicted by the service mesh, a sliced replica of the microservice is created or a pre-configured cloud function is enabled to handle requests specifically for the capability causing the momentary increase in resource requirements, while the service mesh continues routing API calls for other capabilities to the requested microservice. Upon resource requirements subsiding, the sliced replica or pre-configured cloud function is removed.

20 Claims, 9 Drawing Sheets

(56) References Cited

U.S. PATENT DOCUMENTS

| | | | | |
|---|---|---|---|---|
| 2011/0196900 | A1* | 8/2011 | Drobychev | G06F 16/122 |
| | | | | 707/812 |
| 2016/0057107 | A1* | 2/2016 | Call | H04L 63/02 |
| | | | | 726/11 |
| 2017/0187583 | A1* | 6/2017 | Beltt | H04L 41/5009 |
| 2018/0062944 | A1* | 3/2018 | Altman | H04L 67/1008 |
| 2018/0210709 | A1* | 7/2018 | Bharthulwar | G06F 8/24 |
| 2019/0155660 | A1* | 5/2019 | McQuighan | G06F 9/5022 |
| 2020/0106696 | A1* | 4/2020 | Michael | H04L 45/586 |
| 2021/0006489 | A1* | 1/2021 | Jeuk | H04L 65/1046 |
| 2021/0089410 | A1* | 3/2021 | Natanzon | G06F 16/27 |
| 2021/0136095 | A1* | 5/2021 | Dinh | H04L 63/1458 |
| 2022/0035684 | A1* | 2/2022 | Gupte | G06F 9/5083 |
| 2022/0070055 | A1* | 3/2022 | Narasimhan | H04L 41/0686 |
| 2022/0109722 | A1* | 4/2022 | You | G06F 9/5055 |
| 2022/0174543 | A1* | 6/2022 | Meempat | H04W 28/0812 |
| 2022/0215008 | A1* | 7/2022 | Adibowo | G06F 16/244 |
| 2022/0217153 | A1* | 7/2022 | Krishnan | H04L 63/123 |

* cited by examiner

DYNAMIC HANDLING OF SERVICE MESH LOADS USING SLICED REPLICAS AND CLOUD FUNCTIONS

BACKGROUND

The present disclosure relates generally to the field of microservice architecture, and more specifically to service meshes and techniques for managing momentary increases in service mesh loads using sliced replicas and/or cloud functions.

Modern applications are often broken down into this microservice architecture, whereby a loosely coupled and independent network of smaller services each perform a specific business function. The microservices architecture lets developers make changes to an application's services without the need for a full redeploy. Microservices are built independently, communicate with each other, and can individually fail without escalating into an application-wide outage. The microservices communicate via a defined interface using lightweight API's. Because microservices run independently of each other, each service can be updated, deployed and scaled to meet demand for specific functions of an application. In order to execute microservice functions, one service might need to request data from several other services. A service mesh provides a way to control how different parts of an application share data with one another. The service mesh is a dedicated infrastructure layer built right into an application. This visible infrastructure layer can document how well different parts of an application interact with one another, making it easier to optimize communication and avoid downtime as an application grows and changes over time. Each part microservice of the application can rely on other microservices to complete transactions, tasks or other functions requested by users.

The service mesh routes requests from one service to the next, optimizing how all the moving parts of the network of microservices work together. The service mesh takes the logic governing service-to-service communication out of individual services and abstracts the logic to the layer of infrastructure. Requests are routed between microservices of the service mesh through proxies in the infrastructure layer; sometimes individually referred to as "sidecars" because the proxies run alongside each service rather than within the service. Taken together, the "sidecar" proxies decoupled from each service form the mesh network. Within complex microservice architectures, locating problems can be nearly impossible without a service mesh. The service mesh is able to capture aspects of service-to-service communication as performance metrics. Over time, data made visible by the service mesh can be applied to the rules for interservice communication, resulting in more efficient and reliable service requests.

SUMMARY

Embodiments of the present disclosure relate to a computer-implemented method, an associated computer system and computer program products for managing momentary increases in resource requirements of microservice capabilities within a service mesh, the computer-implemented method comprising: tracking, by the service mesh, incoming application programming interface (API) calls to one or more microservices of the service mesh; predicting, by the service mesh, based on the incoming API calls being tracked, a number of expected requests for capabilities of each microservice and a pattern describing an expected increases in the requests for the microservice capabilities over time; checking, by the service mesh, the resource requirements of the microservice capabilities and as a result of checking the resource requirements of the microservice capabilities, identifying, by the service mesh, a capability of a microservice experiencing a momentary increase in resource requirements above the pattern describing the expected increases; and routing, by the service mesh, the incoming API calls requesting the capability of the microservice experiencing the momentary increase in resource requirements to a sliced replica of the microservice accepting only requests for the capability experiencing the momentary increase in resource requirements or a pre-configured cloud function performing the capability of the microservice experiencing the momentary increase in resource requirements.

BRIEF DESCRIPTION OF THE DRAWINGS

The drawings included in the present disclosure are incorporated into, and form part of, the specification. The drawings illustrate embodiments of the present disclosure and, along with the description, explain the principles of the disclosure. The drawings are only illustrative of certain embodiments and do not limit the disclosure.

DETAILED DESCRIPTION

Figure 1:
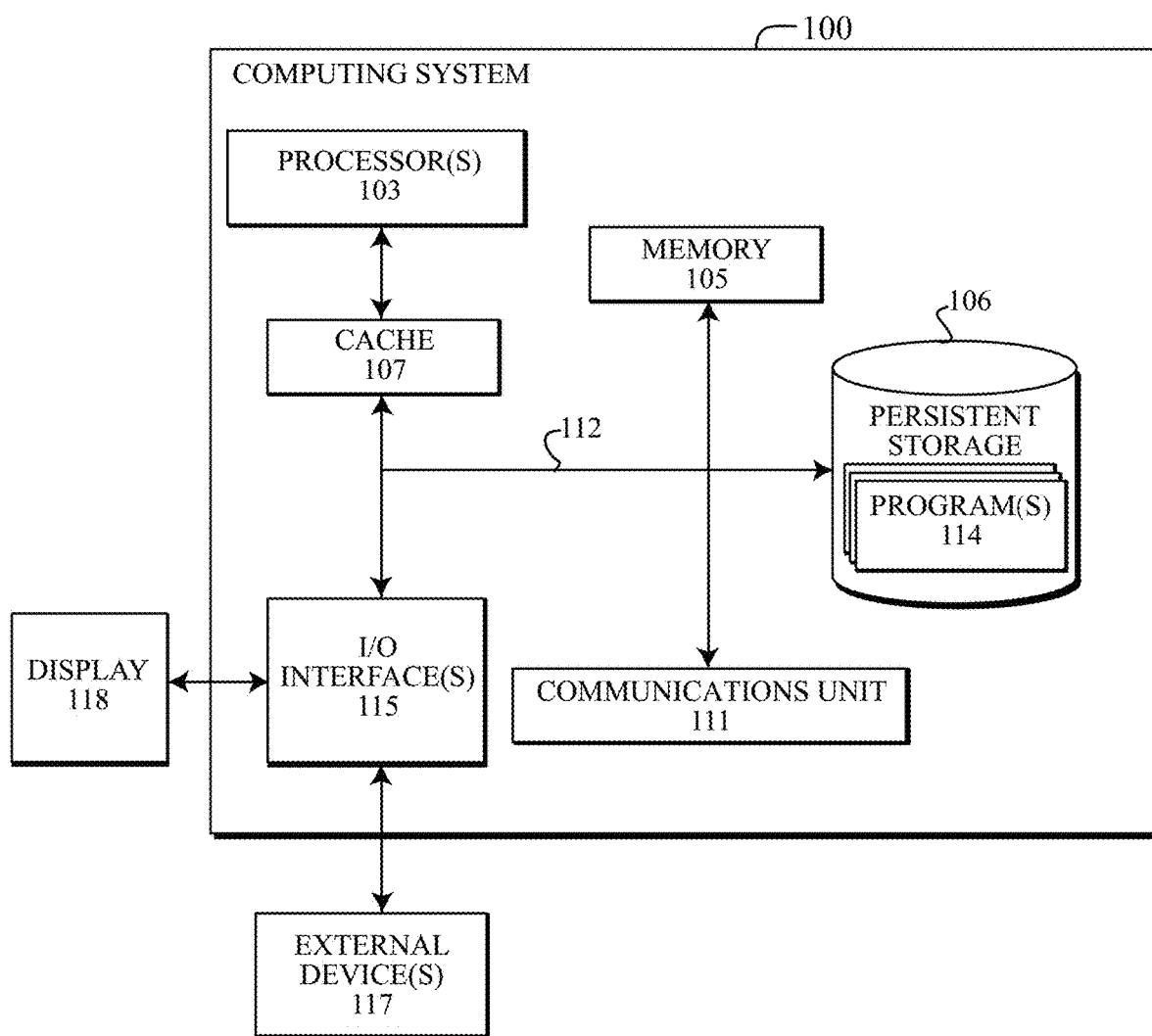
FIG. 1 depicts a block diagram illustrating internal and external components of an embodiment of a computing system in which embodiments described herein may be implemented in accordance with the present disclosure.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

The corresponding structures, materials, acts, and equivalents of all means or steps plus function elements in the claims below are intended to include any structure, material, or act for performing the function in combination with other claimed elements as specifically claimed. The description of the present disclosure has been presented for purposes of illustration and description but is not intended to be exhaustive or limited to the disclosure in the form disclosed. Many modifications and variations will be apparent to those of ordinary skill in the art without departing from the scope and spirit of the disclosure. The embodiments chosen and described are in order to best explain the principles of the disclosure, the practical applications and to enable others of ordinary skill in the art to understand the disclosure for various embodiments with various modifications as are suited to the particular use contemplated.

OVERVIEW

As systems supporting legacy services are updated or converted to architectures that support a microservice philosophy, new challenges for managing the microservices have arisen over time. While service mesh architecture allows networks of microservices to be built and connected through proxies, problems often arise as use of the microservices begins to increase and scale up. A microservice can provide a plurality of capabilities or functions. Often, capabilities or functions of a microservice are not equally requested by users, and often one or more capability or function is requested more frequently than others. When sudden surges in network traffic to microservices occur, and requests are made for a particular capability of the microservice, existing solutions respond to the surge in requests by scaling the microservice up. For example, by creating many full-scale replicas in response to the sudden surge in requests.

Embodiments of the present disclosure recognize creating full-scale replicas of the entire microservice is a resource-intensive endeavor that requires the replicas to be provisioned the same set of resources, such as CPU, memory, etc., as the original micro services being replicated. Instead of creating full-scale replicas of microservices that are only experiencing a momentary increase in resource requirements to handle a surge in requests for particular capabilities of the microservice, embodiments of the present disclosure leverage the use of sliced replicas to target handling the surge of requests to the capability or function being requested. A sliced replica represents a portion of the microservice experiencing the momentary increase in resource requirements. More specifically, the sliced replica can be specifically created to handle requests associated with a specific capability or function of the microservice that is seeing a spike or surge in requests, while all other requests pertaining to other functions or capabilities of the microservice continue to be routed by the service mesh to the microservice. Routing of specific API calls directed toward the limited capabilities or functions of the sliced replica can be implemented by the service mesh by adding dynamic filters that control the ingress of network traffic to the sliced replica and/or proxies of the service mesh. Moreover, because the sliced replicas being implemented by the service mesh are being used to fulfill a limited type of request (i.e., requests specific to a particular capability or function of the microservice) sliced replicas have a lower set of resource requirements compared with full-scale replicas which handle all types of requests that the microservice would handle.

Embodiments of the service mesh may utilize the capability of the service mesh to collect metrics about incoming API calls to each microservice. An example of collected metrics can include an API call history, a history of resources provisioned to the service mesh and individual microservices, a total number of API calls received by each microservice of the service mesh, the API call rate for each microservice and/or a record of the time of day each API call is received. Using the metrics collected by the service mesh, the service mesh may categorize capabilities of each microservice by frequency of use. For example, categorizing capabilities or functions of the microservice that are called frequently versus capabilities or functions that are infrequently called and/or rarely called by an API call. Using the collected metrics of the service mesh, the service mesh is able to predict an expected number of requests for capabilities of a microservice and identify patterns in the API calls requesting specific capabilities, including expected timing for receiving an elevated number of requests for particular capabilities. For example, a service mesh receiving 100 list user requests on a microservice between 10 am and 11 am every morning, regularly receives an additional 10 list users requests every week. Based on this pattern, the service mesh may expect that the predicted increase of requests after 4 weeks would be to receive 140 list users request between 10 am and 11 am every day.

Using the predictions based on patterns observed from the collected service mesh metrics, the service mesh can identify and respond to situations where a momentary increase in a resource requirement is necessitated by an increase in API calls for a capability above the predictable pattern and/or a threshold level of increase. For instance, using the "list user" example above, if instead of receiving 140 list user requests after 4 weeks, the microservice received 240 calls to list users, the service mesh can identify the "list users" capability as creating a momentary increase in resource requirements. When the service mesh detects a momentary increase in resource requirements, the service mesh can create sliced replicas of the microservice, alleviating the microservice from fulfilling the additional load of API calls by routing the API calls for the capability experiencing a momentary increase to the sliced replica, allowing the original microservice (and full-scale replicas thereof) to handle the remaining API calls. For instance, in the example above where there is momentary increase in resource requirements are experienced due to a spike in API calls requesting to list users, a sliced replica can be created by the service mesh and requests to list users can be routed to the sliced replica of the microservice, while remaining API calls, such as calls to create user, delete user, etc. are still routed to the microservice. Furthermore, as the momentary increase in resource requirements subsides, for example due to a decreased amount of API calls for a capability or function back to a level within the predicted pattern or below a threshold, the service mesh may remove the sliced replica and return to routing all API calls to the microservice.

In some embodiments, the service mesh may us preconfigured cloud functions in a manner similar to the sliced replicas to fulfill API calls for capabilities of the microservice being requested at a higher volume than predicted or expected by the service mesh. Instead of creating a sliced replica, the service mesh may query a mapping of microservice capabilities to pre-configured cloud functions. Upon identifying capability that has experienced a momentary increase in resource requirements, the service mesh may configure the service mesh to route API calls for the capability to the pre-configured cloud function. For example, using the "list users" example above, upon the "list users" capability experiencing a momentary increase in resource requirements due to the higher than anticipated number of API calls requesting a list user function, the service mesh can use a pre-configured cloud function established to fulfill the list user function. Once connected to the service mesh, API calls for the "list user" capability of the microservice are routed to the enabled pre-configured cloud function, while the remaining API calls continue to be routed to the microservice. Similar to the sliced replica, upon subsidence of the momentary increase in resource requirements back to predicted levels or below a threshold level, the pre-configured cloud function can be disabled and routing of all API calls, including the capability previously experiencing a momentary increase in resource requirements, are routed back through the microservice of the service mesh instead of the pre-configured cloud function.

Furthermore, in some embodiments, the service mesh can recognize situations where the increase in resource requirements may be considered more than a momentary increase. Instead, the increase in resource requirements may be considered a permanent increase in resource requirements. For example, when API calls for a requested capability continue to be maintained at an elevated level or increase even further over time for a threshold period of time, and/or the service mesh predictions expect the number of API calls for the capability to continue into the future. In situations where sliced replicas were implemented to address the momentary increase in resource requirements that the service mesh now considers permanent increases, the service mesh may convert the sliced replicas into full-scale replicas of the microservice. During the conversion process, sliced replicas may be reconfigured to allow any traffic for the microservice to be routed to the full-scale replica of the microservice. Moreover, the full-scale replica can be allotted additional resources, including additional resources equal to those resources provisioned to the microservice that is being replicated. Once converted and reconfigured, the full-scale replica may receive traffic for any API call for the microservice and may fulfill requests for any capabilities or functions that are provided by the microservice by routing the requests to the full-scale replica.

Computing System

The present invention may be a system, a method, and/or a computer program product at any possible technical detail level of integration. The computer program product may include a computer-readable storage medium (or media) having the computer-readable program instructions thereon for causing a processor to carry out aspects of the present invention.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network, and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer-readable program instructions for storage in a computer-readable storage medium within the respective computing/processing device.

Computer-readable program instructions for carrying out operations of the present invention may be assembler instructions, instruction-set-architecture (ISA) instructions, machine instructions, machine-dependent instructions, microcode, firmware instructions, state-setting data, configuration data for integrated circuitry, or either source code or object code written in any combination of one or more programming languages, including an object-oriented programming language such as Smalltalk, C++, or the like, and procedural programming languages, such as the "C" programming language or similar programming languages. The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer-readable program instructions by utilizing state information of the computer-readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer-readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the function/act specified in the flowchart and/or block diagram block or blocks.

The computer-readable program instructions may also be loaded onto a computer, other programmable data processing apparatus, or other devices to cause a series of operational steps to be performed on the computer, other programmable apparatus, or other devices to produce a computer-implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

FIG. 1 illustrates a block diagram describing an embodiment of a computing system 100, which may be a simplified example of a computing device (i.e., a physical bare metal system and/or a virtual system) capable of performing the computing operations described herein. Computing system 100 may be representative of the one or more computing systems or devices implemented in accordance with the embodiments of the present disclosure and further described below in detail. It should be appreciated that FIG. 1 provides only an illustration of one implementation of a computing system 100 and does not imply any limitations regarding the environments in which different embodiments may be implemented. In general, the components illustrated in FIG. 1 may be representative of any electronic device, either physical or virtualized, capable of executing machine-readable program instructions.

Although FIG. 1 shows one example of a computing system 100, a computing system 100 may take many different forms, including bare metal computer systems, virtualized computer systems, container-oriented architecture, microservice-oriented architecture, etc. For example, computing system 100 can take the form desktop computer system or workstation, laptops, notebooks, tablets, servers, client devices, network devices, network terminals, thin clients, thick clients, kiosks, mobile communication devices (e.g., smartphones), multiprocessor systems, microprocessor-based systems, minicomputer systems, mainframe computer systems, smart devices, and/or Internet of Things (IoT) devices. The computing systems 100 can operate in a local computing environment, networked computing environment, a containerized computing environment comprising one or more pods or clusters of containers, and/or a distributed cloud computing environment, which can include any of the systems or devices described herein and/or additional computing devices or systems known or used by a person of ordinary skill in the art.

Computing system 100 may include communications fabric 112, which can provide for electronic communications among one or more processor(s) 103, memory 105, persistent storage 106, cache 107, communications unit 111, and one or more input/output (I/O) interface(s) 115. Communications fabric 112 can be implemented with any architecture designed for passing data and/or controlling information between processor(s) 103 (such as microprocessors, CPUs, and network processors, etc.), memory 105, external devices 117, and any other hardware components within a computing system 100. For example, communications fabric 112 can be implemented as one or more buses, such as an address bus or data bus.

Memory 105 and persistent storage 106 may be computer-readable storage media. Embodiments of memory 105 may include random access memory (RAM) and/or cache 107 memory. In general, memory 105 can include any suitable volatile or non-volatile computer-readable storage media and may comprise firmware or other software programmed into the memory 105. Program(s) 114, application(s), processes, services, and installed components thereof, described herein, may be stored in memory 105 and/or persistent storage 106 for execution and/or access by one or more of the respective processor(s) 103 of the computing system 100.

Persistent storage 106 may include a plurality of magnetic hard disk drives, solid-state hard drives, semiconductor storage devices, read-only memories (ROM), erasable programmable read-only memories (EPROM), flash memories, or any other computer-readable storage media that is capable of storing program instructions or digital information.

Embodiments of the media used by persistent storage 106 can also be removable. For example, a removable hard drive can be used for persistent storage 106. Other examples include optical and magnetic disks, thumb drives, and smart cards that are inserted into a drive for transfer onto another computer-readable storage medium that is also part of persistent storage 106.

Communications unit 111 provides for the facilitation of electronic communications between computing systems 100. For example, between one or more computer systems or devices via a communication network. In the exemplary embodiment, communications unit 111 may include network adapters or interfaces such as a TCP/IP adapter cards, wireless interface cards, or other wired or wireless communication links. Communication networks can comprise, for example, copper wires, optical fibers, wireless transmission, routers, load balancers, firewalls, switches, gateway computers, edge servers, and/or other network hardware which may be part of, or connect to, nodes of the communication networks including devices, host systems, terminals or other network computer systems. Software and data used to practice embodiments of the present disclosure can be downloaded to the computing systems 100 operating in a network environment through communications unit 111 (e.g., via the Internet, a local area network, or other wide area networks). From communications unit 111, the software and the data of program(s) 114 or application(s) can be loaded into persistent storage 106.

One or more I/O interfaces 115 may allow for input and output of data with other devices that may be connected to computing system 100. For example, I/O interface 115 can provide a connection to one or more external devices 117 such as one or more smart devices, IoT devices, recording systems such as camera systems or sensor device(s), input devices such as a keyboard, computer mouse, touch screen, virtual keyboard, touchpad, pointing device, or other human interface devices. External devices 117 can also include portable computer-readable storage media such as, for example, thumb drives, portable optical or magnetic disks, and memory cards. I/O interface 115 may connect to human-readable display 118. Human-readable display 118 provides a mechanism to display data to a user and can be, for example, computer monitors or screens. For example, by displaying data as part of a graphical user interface (GUI). Human-readable display 118 can also be an incorporated display and may function as a touch screen, such as a built-in display of a tablet computer.

Figure 2:
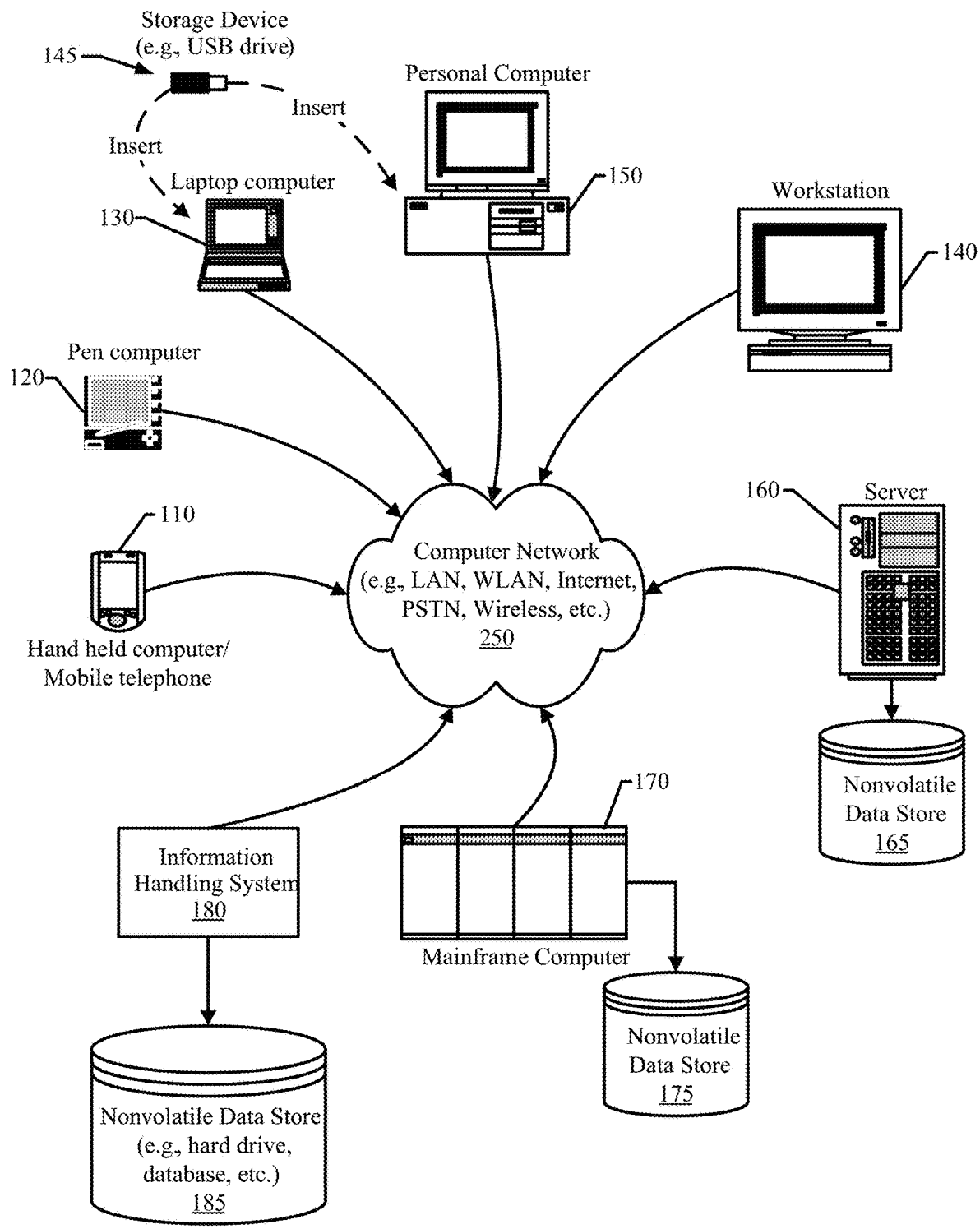
FIG. 2 depicts a block diagram illustrating an extension of the computing system environment of FIG. 1, wherein the computing systems are configured to operate in a network environment and perform methods described herein in accordance with the present disclosure.

FIG. 1 provides an extension of the computing system 100 environment shown in FIG. 2 to illustrate that the methods described herein can be performed on a wide variety of computing systems that operate in a networked environment. Types of computing systems 100 may range from small handheld devices, such as handheld computer/mobile telephone 110 to large mainframe systems, such as mainframe computer 170. Examples of handheld computer 110 include personal digital assistants (PDAs), personal entertainment devices, such as Moving Picture Experts Group Layer-3 Audio (MP3) players, portable televisions, and compact disc players. Other examples of information handling systems include pen, or tablet computer 120, laptop or notebook computer 130, workstation 140, personal computer system 150, and server 160. Other types of information handling systems that are not individually shown in FIG. 2 are represented by information handling system 180.

Many of the computing systems can include nonvolatile data stores, such as hard drives and/or nonvolatile memory. The embodiment of the information handling system shown in FIG. 2 includes separate nonvolatile data stores (more specifically, server 160 utilizes nonvolatile data store 165, mainframe computer 170 utilizes nonvolatile data store 175, and information handling system 180 utilizes nonvolatile data store 185). The nonvolatile data store can be a component that is external to the various computing systems or can be internal to one of the computing systems. In addition, removable nonvolatile storage device 145 can be shared among two or more computing systems using various techniques, such as connecting the removable nonvolatile storage device 145 to a USB port or other connector of the computing systems. In some embodiments, the network of computing systems 100 may utilize clustered computing and components acting as a single pool of seamless resources when accessed through network 250 by one or more computing systems. For example, such embodiments can be used in a datacenter, cloud computing network, storage area network (SAN), and network-attached storage (NAS) applications.

As shown, the various computing systems 100 can be networked together using computer network 250 (referred to herein as "network 250"). Types of networks 250 that can be used to interconnect the various information handling systems include Local Area Networks (LANs), Wireless Local Area Networks (WLANs), home area network (HAN), wide area network (WAN), backbone networks (BBN), peer to peer networks (P2P), campus networks, enterprise networks, the Internet, single tenant or multi-tenant cloud computing networks, the Public Switched Telephone Network (PSTN), and any other network or network topology known by a person skilled in the art to interconnect computing systems 100.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. A cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 3:
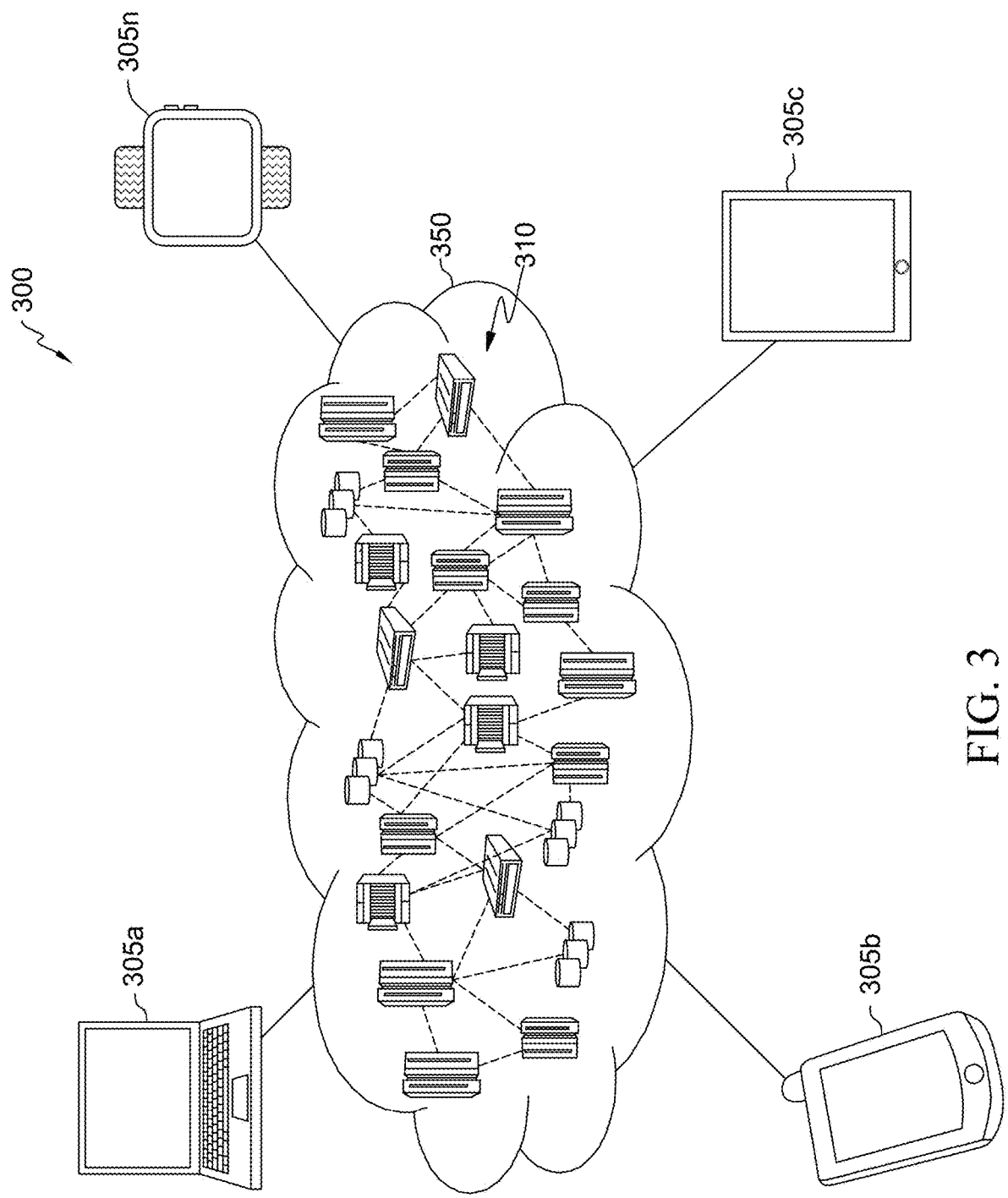
FIG. 3 depicts a block diagram illustrating a cloud computing environment in accordance with the present disclosure.

Referring to the drawings, FIG. 3 is an illustrative example of a cloud computing environment 300. As shown, cloud computing environment 300 includes a cloud network 350 comprising one or more cloud computing nodes 310 with which end user device(s) 305a-305n (referred to generally herein as end user device(s) 305) or client devices, may be used by cloud consumers to access one or more software products, services, applications, and/or workloads provided by cloud service providers or tenants of the cloud network 350. Examples of the user device(s) 305 are depicted and may include devices such as a desktop computer, laptop computer 305a, smartphone 305b or cellular telephone, tablet computers 305c and smart devices such as a smartwatch 305n and smart glasses. Nodes 310 may communicate with one another and may be grouped (not shown) physically or virtually, in one or more networks, such as Private, Community, Public, or Hybrid clouds as described hereinabove, or a combination thereof. This allows cloud computing environment 300 to offer infrastructure, platforms and/or software as services for which a cloud consumer does not need to maintain resources on a local computing device. It is understood that the types of end user devices shown in FIG. 3 are intended to be illustrative only and that computing nodes 310 of cloud computing environment 300 can communicate with any type of computerized device over any type of network and/or network addressable connection (e.g., using a web browser).

Figure 4:
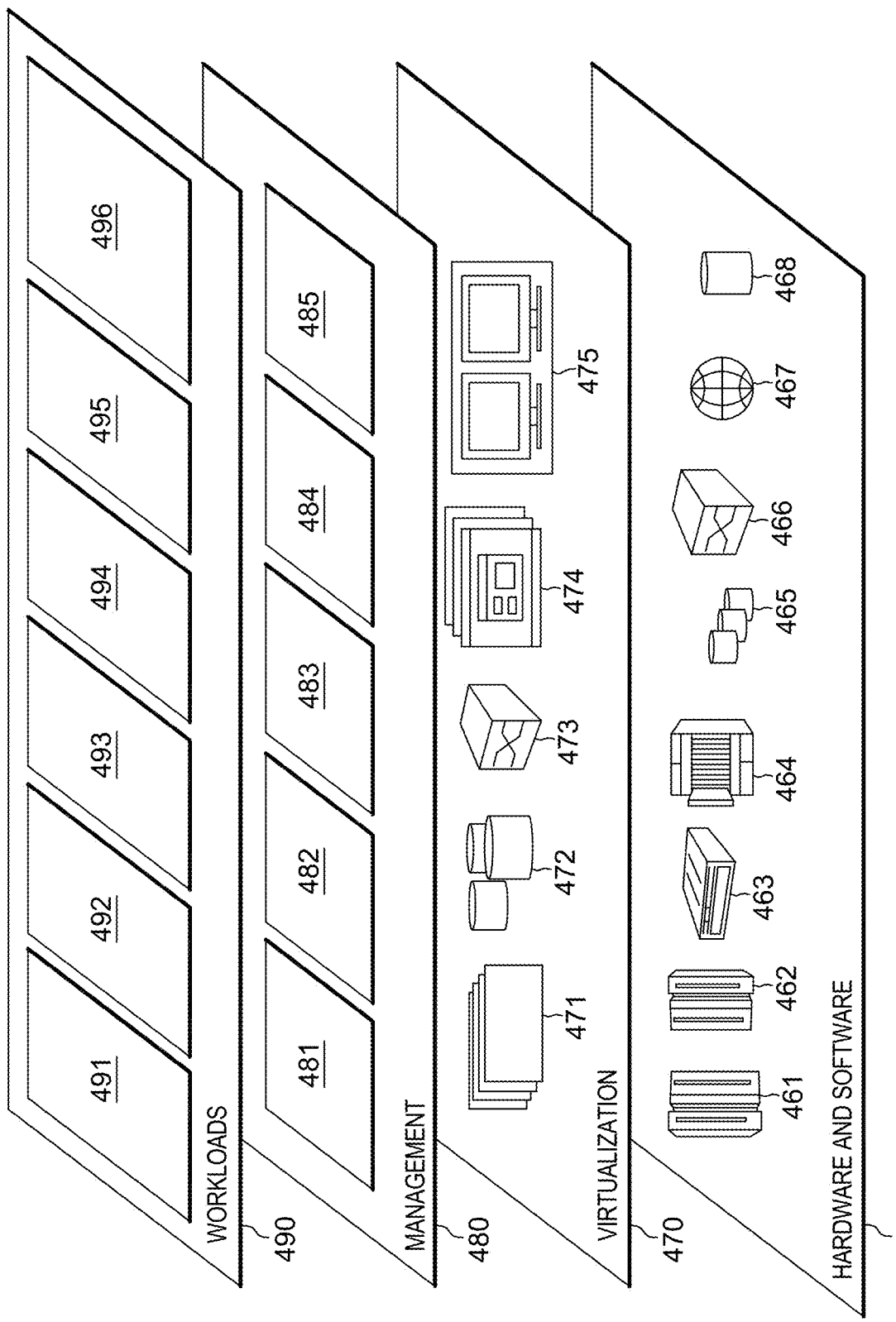
FIG. 4 depicts an embodiment of abstraction model layers of a cloud computing environment in accordance with the present disclosure.

Referring now to FIG. 4, a set of functional abstraction layers provided by cloud computing environment 300 is shown. It should be understood in advance that the components, layers, and functions shown in FIG. 4 are intended to be illustrative only and embodiments of the invention are not limited thereto. As depicted, the following layers and corresponding functions are provided:

Hardware and software layer 460 includes hardware and software components. Examples of hardware components include mainframes 461; RISC (Reduced Instruction Set Computer) architecture-based servers 462; servers 463; blade servers 464; storage devices 465; and networks and networking components 466. In some embodiments, software components include network application server software 467 and database software 468.

Virtualization layer 470 provides an abstraction layer from which the following examples of virtual entities may be provided: virtual servers 471; virtual storage 472; virtual networks 473, including virtual private networks; virtual applications and operating systems 474; and virtual clients 475.

Management layer 480 may provide the functions described below. Resource provisioning 481 provides dynamic procurement of computing resources and other resources that are utilized to perform tasks within the cloud computing environment 300. Metering and pricing 482 provide cost tracking as resources are utilized within the cloud computing environment 300, and billing or invoicing for consumption of these resources. In one example, these resources can include application software licenses. Security provides identity verification for cloud consumers and tasks, as well as protection for data and other resources. User portal 483 provides access to the cloud computing environment 300 for consumers and system administrators. Service level management 484 provides cloud computing resource allocation and management such that required service levels are met. Service Level Agreement (SLA) planning and fulfillment 485 provide pre-arrangement for, and procurement of, cloud computing resources for which a future requirement is anticipated in accordance with an SLA.

Workloads layer 490 provides examples of functionality for which the cloud computing environment may be utilized. Examples of workloads and functions which may be provided from this layer include software development and lifecycle management 491, data analytics processing 492, multi-cloud management 493, transaction processing 494; database management 495 and video conferencing 496.

System for Managing Momentary Increases in Resource Requirements of Microservices in a Service Mesh It will be readily understood that the instant components, as generally described and illustrated in the Figures herein, may be arranged and designed in a wide variety of different configurations. Accordingly, the following detailed description of the embodiments of at least one of a method, apparatus, non-transitory computer readable medium and system, as represented in the attached Figures, is not intended to limit the scope of the application as claimed but is merely representative of selected embodiments.

The instant features, structures, or characteristics as described throughout this specification may be combined or removed in any suitable manner in one or more embodiments. For example, the usage of the phrases "example embodiments," "some embodiments," or other similar language, throughout this specification refers to the fact that a particular feature, structure, or characteristic described in connection with the embodiment may be included in at least one embodiment. Accordingly, appearances of the phrases "example embodiments," "in some embodiments," "in other embodiments," or other similar language, throughout this specification do not necessarily all refer to the same group of embodiments, and the described features, structures, or characteristics may be combined or removed in any suitable manner in one or more embodiments. Further, in the Figures, any connection between elements can permit one-way and/or two-way communication even if the depicted connection is a one-way or two-way arrow. Also, any device depicted in the drawings can be a different device. For example, if a mobile device is shown sending information, a wired device could also be used to send the information.

Figure 5:
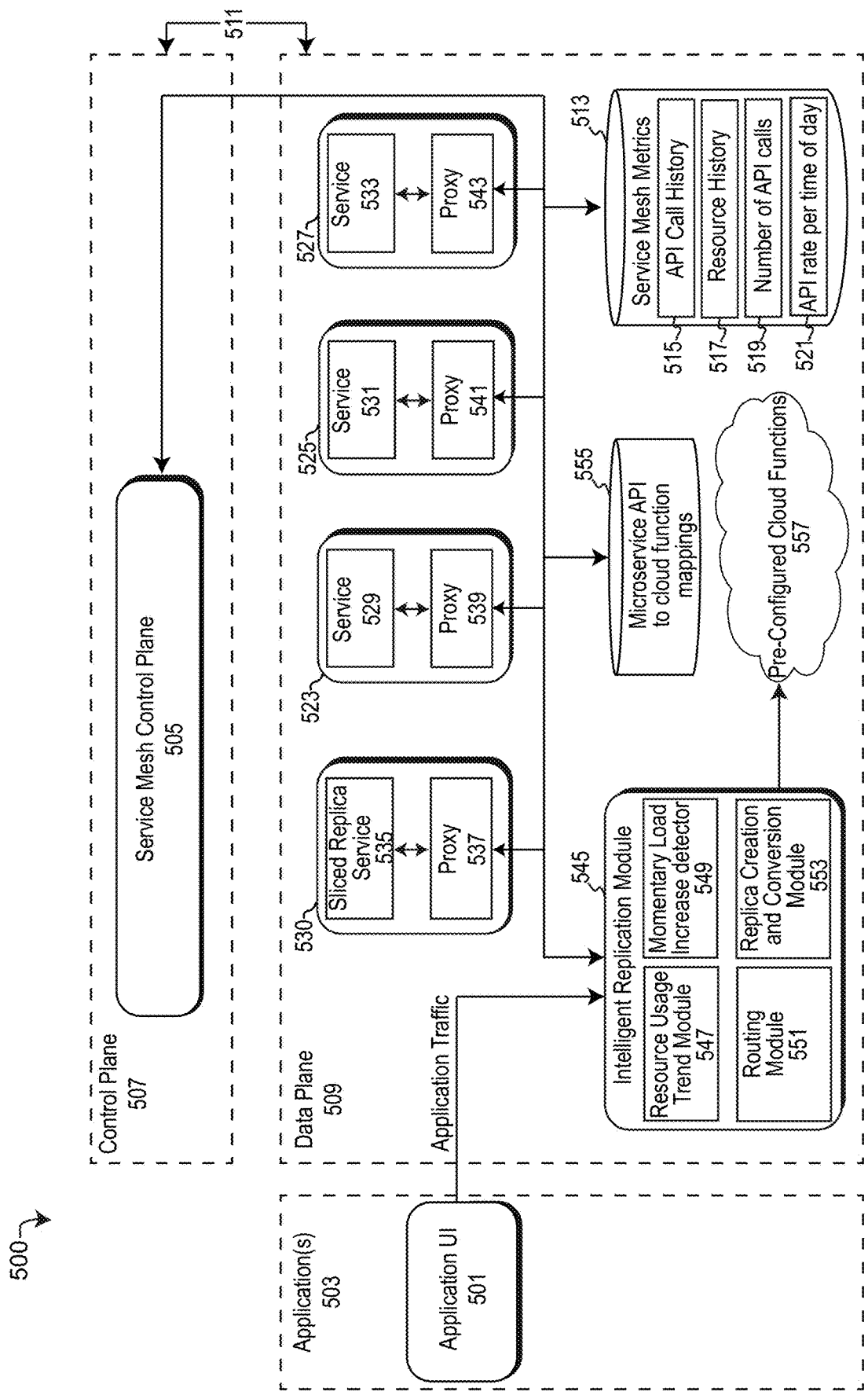
FIG. 5 depicts a functional block diagram describing an embodiment of a service mesh computing environment for dynamically managing momentary increases in resource requirements of microservice capabilities using a sliced replica or pre-configured cloud functions, in accordance with the present disclosure.

Referring to the drawings, FIG. 5 depicts an embodiment of a computing environment 500 illustrating a microservice architecture that can be executed on one or more computing systems 100 and variations thereof. As illustrated in the embodiment of the computing environment 500, a plurality of planes (or layers) of the environment 500 are placed in communication with one another. As depicted, the computing environment 500 includes (but is not limited to) an application plane or layer comprising one or more application(s) 503, a control plane 507 and a data plane 509.

Embodiments of the application layer may be the layer of the network comprising one or more application(s) 503 that may make requests for network functions from the control plane 507 and/or data plane 509. The combination of the control plane 507 and the data plane 509 make up the service mesh 511. Users accessing the applications 503 of the application layer may input the requests for services and/or functions of the network by interacting with a user interface (UI) of the application 503. For example, the application UI 501 shown in FIG. 5. End user devices or client devices may request the services or functions from the planes of the service mesh 511 by inputting or transmitting one or more calls via the application UI 501 to the service mesh 511. More specifically, API calls may be directed toward the capabilities or functions of one or more microservices 529, 531, 533 (generally referred to herein as microservices 529, 531, 533 or services 529, 531, 533). Embodiments of the application UI 501 may be part a mobile application, web application, SaaS application, etc. For example, mobile applications may be inputting requests and routing data through the service mesh 511 by transmitting an API call to an API gateway of the network. In other examples, clients may be using a command line interface (CLI) to input commands to the service mesh 511 and/or a web-based UI transmitting an HTTP request via a web browser. Transaction requests to one or more microservices 529, 531, 533 of an application 503 may be initiated by external user(s), and/or external services incoming from outside of service mesh 511 network.

In some embodiments, the application 503 accessing and inputting commands into the computing environment 500 may be via a control plane UI being accessed by one or more administrators of the microservices 529, 531, 533. Administrators of the service mesh 511 may be able to obtain an overview of applications 503 running on the service mesh 511, including a view of applications 503 running on each cluster, create or modify computing resources of the service mesh 511 and deploy instances 523, 525, 527 of services 529, 531, 533 which may be instantiated as part of a pod, container or cluster. Moreover, administrators of the service mesh can use the control plane UI to scale service mesh 511 deployments; instances of services; restart pods or containers and/or deploy new applications 503 or services 529, 531, 533. For example, scaling deployments of microservices 529 by creating full-scale replicas of the service 529 to add a new instance 525 comprising a service 531 or by creating instances 530 of sliced replicas 535 of service 529 offering a limited subset of capabilities and functions of an existing microservice 529, 531, 533.

Embodiments of the control plane 507 of the service mesh 511, may configure the data plane 509 based on a declared or desired state of the service mesh 511. The control plane 507 may be the portion or part of a network responsible for controlling how data packets are forwarded from a first location of the network to a destination of the network, and the route the data will take to arrive at the destination. A control plane 507 may be responsible for creating a routing table, routing rules, and implementing various protocols to identify the network paths that may be used by the network. The control plane 207 can store the network paths to the routing table. Examples of protocols used for creating routing tables may include Border Gateway Protocol (BGP), Open Shortest Path First (OSPF), and/or Intermediate System to Intermediate System (IS-IS).

Embodiments of the service mesh control plane 505, may provide rules, policies and/or configurations enacted for each of the running data planes 509 of a service mesh 511. The service mesh control plane 505 may provide policies and configurations for all of the running data planes 509 in a service mesh 511 but does not touch any packets or requests transmitted by the external user(s) or external service making API calls. Embodiments of the service mesh control plane 505 may turn all the data planes 509 into a distributed system. The service mesh 511 may be initially configured by a human administrator interacting with the service mesh control plane 505 via a UI to control the distributed system of the service mesh 511. For example, the administrator may interact with the service mesh control plane 505 through a web portal, CLI or some other interface. Through the UI, the operator or administrator may access global system configurations for the service mesh 511, including but not limited to, deployment control, authentication and authorization settings, route table specifications, initial application logging settings and load balancer settings such as timeouts, retries, circuit breakers, etc.

Embodiments of the service mesh control plane 505, may further include additional components that configure the service mesh 511. For example, in some embodiments, the service mesh control plane 505 may further configure a workload scheduler, service discovery and sidecar proxy configuration APIs. The services 529, 531, 533 and sliced replicas 535 thereof may run on infrastructure via a scheduling system (e.g., Kubernetes®), and the workload scheduler may be responsible for bootstrapping a service 529, 531, 533, 539 along with a sidecar or proxy 537, 539, 541, 543. As the workload scheduler starts and stops instances 523, 525, 527, 530 of the services 529, 531, 533, 535, the service discovery component may report the state of services 529, 531, 533, 535 and may be the process responsible for automatically finding instances 523, 525, 527, 530 of services 529, 531, 533, 535 to fulfill queries and requests. Embodiments of sidecar proxy configuration APIs may describe the configuration of the proxies 537, 539, 541, 543 mediating inbound and outbound communication to the service 529, 531, 533, 535 attached to the proxies 537, 539, 541, 543. During configuration of the proxies 537, 539, 541, 543, all proxies 537, 539, 541, 543 may be programmed in the service mesh 511 with configuration settings that may allow the proxies 537, 539, 541, 543 to reach every instance 523, 525, 527, 530, service 529, 531, 533 and/or sliced replica 535 service of the service mesh 511. Moreover, the sidecar proxy configuration APIs may configure the proxies 537, 539, 541, 543 to accept traffic on all ports associated with a service 529, 531, 533 or sliced replica service 535. Furthermore, through the sidecar proxy configuration APIs, the service mesh control plane 505 may fine tune the set of ports, and protocols that a proxy 537, 539, 541, 543 may accept when forwarding traffic to and from an instance 523, 525, 527, 530, service 529, 531, 533, and/or sliced replica 535 of a service. Additionally, through the sidecar proxy configuration APIs, the service mesh control plane 505 may restrict a set of services 529, 531, 533 or sliced replicas 535 of a service that a proxy 537, 539, 541, 543 may reach when forwarding outbound traffic from a service 529, 531, 533, sliced replica 535 or instance 523, 525, 527, 530.

Embodiments of the service mesh control plane 205 may organize instances 523, 525, 527, 530 (such as one or more pods, containers or clusters), services 529, 531, 533, sliced replicas 535 of a service, and/or proxies 537, 539, 541, 543 into one or more networks or namespaces. The service mesh control plane 505 may enroll a set of namespaces to a service mesh 511 and upon enrolling a namespace, the service mesh control plane 505 may enable monitoring of resources within the namespace, including the monitoring of any applications deployed as pods, services 529, 531, 533, sliced replicas 535 of services or other types of instances 523, 525, 527, 530, and traffic policies. Enrolling a namespace also optionally allows for metrics to be collected for resources in the given namespace and for instances 523, 525, 527, 530 of pods or services 529, 531, 533, sliced replicas 535 of services within the namespace to be automatically injected with proxy 537, 539, 541, 543 containers.

Referring now to the data plane 509, embodiments of the data plane 509 may be responsible for touching every packet of data and/or request of the service mesh 511. In other words, the data plane 509 of the service mesh 511 may be responsible for conditionally translating, forwarding, and observing every network packet that flows to and from the instances 523, 525, 527, 530 of services 529, 531, 533, sliced replicas 535 of services and/or proxies 537, 539, 541, 543 within the service mesh 511. As illustrated in the exemplary embodiment, the data plane 509 may comprise a plurality of instances 523, 525, 527, 530 such as one or more clusters, pods, or containers which may be hosting a service 529, 531, 533, or sliced replica 535 of services within the instance 523, 525, 527, 530. Embodiments of each service 529, 531, 533, or sliced replica 535 of services may be co-located within an instance 523, 525, 527, 530, with a sidecar network proxy 537, 539, 541, 543. For example, as shown in FIG. 5, service 529 is co-located with proxy 539 within instance 523; service 531 is co-located with proxy 541 within instance 525; service 533 is co-located with proxy 543 within instance 527; and a sliced replica 535 of a service is co-located with proxy 537 within instance 530 of the data plane 509. Network traffic (e.g., HTTP, REST, gRPC, Redis, etc.) from individual services 529, 531, 533, or sliced replica 535 of services may flow via the local proxies 537, 539, 541, 543 to a destination routed by the service mesh 511, in accordance with the routing rules and policies of the service mesh 511. Since the data flows from the services 529, 531, 533, 535 to the co-located proxy 537, 539, 541, 543 the services 529, 531, 533, or sliced replica 535 services thereof may not be aware of the network of services at large that may form the data plane 209. Instead, the services 529, 531, 533, 535 themselves may only be aware of their local proxy 537, 539, 541, 543.

Embodiments of the proxies 537, 539, 541, 543 may be responsible for performing tasks associated with service discovery, health checking, routing, load balancing, authentication/authorization, and observability. Service discovery tasks may include discovery of upstream and/or backend services 529, 531, 533, sliced replicas 535 of services and instances thereof that are available on the data plane 509 of the service mesh 511. Health checking tasks may include determining whether upstream services 529, 531, 533, sliced replicas 535 of services and instances thereof returned by service discovery are healthy and ready to accept network traffic. Health checking may include both active health checking and/or passive health checking.

Routing tasks of the proxies 537, 539, 541, 543 may include directing requests to a proper instance 523, 525, 527, 530, cluster, pod or container of a service 529, 531, 533 and/or a sliced replica 535 thereof. For example, a REST request for a local instance 523 of a service 529, a proxy 539 tasked with sending an outbound communication to the next service 531 of a microservice chain or a sliced replica 535 of service 529, knows where to send the communication such as API calls for specific capabilities or functions according to the routing rules and configurations. Authentication and authorization tasks of the proxies 537, 539, 541, 543 may include the performance of cryptographic attestation of incoming requests in order to determine if the request being invoked by an API call is valid and allowable. For example, the user sending the requested call is authenticated the proxy 537, 539, 541, 543 using Mutual Transport Layer Security (mTLS) or another mechanism of authentication, and if the user is allowed to invoke the requested endpoint service of the service mesh 511, the proxy 537, 539, 541, 543 may route the request to the next service 529, 531, 533 or sliced replica 535 along the microservice chain. Otherwise, the proxy 537, 539, 541, 543 can return an unauthenticated response to an external user or external service indicating that it is not authorized to invoke a particular call function and/or a user is not authenticated by the service mesh 511.

Embodiments of the proxies 537, 539, 541, 543 may perform one or more observability tasks of the service mesh 511. The observability tasks may include, for each request by an API call, the collection of detailed metrics of the service mesh 511, including statistics about API call histories 515, including resource usage history 517 for each microservice 529, 531, 533 or sliced replica 535 thereof, the number of API calls 519, the time an API call is made and the API call rate per time of day 521. Observability tasks may also include generation of distributed tracing data that may allow operators and administrators of the service mesh 511 to understand the distributed traffic flow of the service mesh 511. Embodiments of the service mesh 511 may keep track of all possible services 529, 531, 533 or sliced replica 535 thereof, being invoked by users. Embodiments of the service mesh 511 may track the functions or capabilities of services 529, 531, 533 or sliced replicas 535 being invoked on a per user basis and store the data associated with the user's invoked services 529, 531, 533, 535 to profiles associated with the users (i.e., user profiles).

Over time, the service mesh 511 may build a heuristics database comprising historical metrics collected by the service mesh 511 via the proxies 537, 539, 541, 543, as requested calls are made and fulfilled. Embodiments of the service mesh 511 can use the collected metrics to keep track of all API calls being made to the service mesh 511, and the impact of API calls on the increase in resource requirements necessary to fulfill the requested function by one or more services 529, 531, 533. The collected metrics stored by the heuristics database may be a source of information for predicting each type of API call, the expected rate each type of API is predicted to occur and predicting patterns for increases in different types of API calls over time by the service mesh 511. In the exemplary embodiment of FIG. 5, the heuristics database collecting metrics of the service mesh 511 may be referred to as service mesh metrics 513. Proxies 537, 539, 541, 543 of the service mesh 511 may collect and store a plurality of different metrics to the database of service mesh metrics 513 over time, along with user profiles associated with the metrics being collected. For example, the types of metrics being collected by the service mesh 511 may be an API call history 515 (including the type of API call being made), a resource usage history 517 associated with the API calls being carried out by the services 529, 531, 533 and sliced replicas 535 thereof) the number of retries to successfully complete an API call, the type of errors, warnings and failures that are occurring from the API calls, time stamps, security events, API call rates generally and/or API call rates at specific times of day.

Historical service mesh metrics 513 collected from the proxies 537, 539, 541, 543, microservices 529, 531, 533 or sliced replicas 535 thereof of the service mesh 511 make it possible for the service mesh 511 to perform historical analysis of service mesh activities and transactions and predict each type of API call, the expected API call rates for specific functions or capabilities of each microservice and, based on patterns of the API calls observed from the analysis of the service mesh metrics 513, predict the number of API call requests for each capability or function of each microservice and expected patterns of increases in API calls over time for each capability or function provided by microservices. The service mesh 511 via the service mesh control plane 505 may access and view current API call rates for each of the microservices and microservice chains, the API call rates for specific capabilities or functions of the microservices, as well as expected API call rates and expected patterns for increased API call rates over time.

Embodiments of the service mesh control plane 505 may deploy an intelligent replication module 545 to track resource usage trends over time as a function of the API call rates, identify momentary increases in resource requirements for one or more capabilities or functions of the microservices 529, 531, 533, routing network traffic in response to API calls to one or more microservice 529, 531, 533 or sliced replica 535 of the service mesh 511, based on the type of API call being requested, create and deploy of sliced replicas 535 as well as the convert sliced replicas 535 to full-scale replicas of microservices 529, 531, 533. The term "module" may refer to a hardware module, software module, or a module may be a combination of hardware and software resources. Embodiments of hardware-based modules may include self-contained components such as chipsets, specialized circuitry, one or more memory 105 devices and/or persistent storage 106. A software-based module may be part of a program 114, program code or linked to program code containing specifically programmed instructions loaded into a memory 105 device or persistent storage 106 device of one or more specialized computing systems 100 operating as part of the computing environment 200. For instance, in the exemplary embodiment depicted in FIG. 5, the intelligent replication module 545 includes a plurality of components or modules, including (but not limited to) a resource usage trend module 547, a momentary load increase detector 549, a routing module 551 and a replica creation and conversion module 553.

Embodiments of resource usage trend module 547 may be responsible for performing tasks or functions of the service mesh responsible for predicting trends for expected incoming API calls and expected increases for each type of API call received by service mesh 511. Predictions about the number of API calls expected to be received, the types of calls expected to be received, time periods during the day when calls are expected to increase or decreases as well as overall predicted increases in API calls received may be based on patterns of API calls being observed as a function of service mesh metrics 513 collected by the service mesh 511. For instance, the API call history 515, resource history 517, number of API calls 519 and the rate of API calls being received per different times of day (API rate per time of day 521) may be used as inputs into the resource usage trend module 547. The resource usage trend module 547 may output one or more predictions from the service mesh metrics 513 being inputted. For example, resource usage trend module 547 may predict an expected number of incoming API calls during a selected period of time, the types of API calls being received for each function or capability of the microservices 529, 531, 533 of the service mesh 511, and a predicted level of increases in API calls over a selected period of time. For example, over period of several weeks, the resource usage trend module 547 may observe that API calls for specific functions or capabilities of microservices 529, 531, 533 are around 1000 per day, but are increasing by 100 API calls per week on average over a period of time. The resource usage trend module 547 may use the 1000 API calls per day rate and the rate of increase to predict an amount of API calls for the capability or function of the microservices receiving the API calls for the next few weeks, months or even a year or more into the future. Moreover, as changes in the service mesh metrics 513 change over time, the resource usage trend module 547 may periodically re-assess the collected metrics and revise predictions to reflect the most recent levels of metrics being collected, including updated trends in API call rates and the microservices 529, 531, 533 being invoked and the specific functions or capabilities being called.

Embodiments of the resource usage trend module 547 may use machine learning models to make predictions about the trends in API calls, API call rates for specific microservice capabilities and functions as well as resource usage increases as a result of the increases API call rates to service mesh 511. In some embodiments, the machine learning models deployed by resource usage trend module 547 to make predictions may be based on the Naïve Bayes algorithm. Naïve Bayes is a classification technique based on Bayes' Theorem; a mathematical formula used for calculating conditional probabilities of an event occurring given that another event has (by assumption, presumption, assertion, or evidence) occurred. Bayes theorem may be written as follows:

$$P(A \mid B) = \frac{P(B \mid A) * P(A)}{P(B)}$$

wherein: P(A|B) is the probability of an event A occurring given evidence event B has already occurred (referred to as the posterior probability);

P(B|A) is the probability of event B occurring given evidence event A has already occurred;

P(A) is the probability that event A happens on its own; and P(B) is the probability that event B happens on its own.

A fundamental assumption of the Bayes theorem is that each feature operates on an assumption of independence among predictors and each feature has an equal contribution to the outcome. In other words, the Naïve Bayes theorem is a classifier that assumes that the presence of a particular feature in a class is un-related to the presence of any other feature. In order to predict API call trends and/or resource usage trends based on the features and attributes of the service mesh metrics 513, the Bayes Theorem can be rewritten to predict class variables (y) given conditions as presented by the collected service mesh metrics 513; namely one or more parameters, attributes and features (X) of the service mesh metric's 513 dataset. The rewritten Bayes Theorem may be written as follows:

$$P(y \mid X) = \frac{P(X \mid y) * P(y)}{P(X)}$$

Since X represents the individual parameters, attributes and features (x) of the service mesh metrics 513 inputted into machine learning model of the Naïve Bayes algorithm, $X=(x_1, x_2, x_3 \ldots x_n)$. By substituting for X and expanding the Bayes Theorem using the chain rule, the equation may be expanded as follows:

$$P(y \mid x_1, \ldots x_n) = \frac{P(x_1 \mid y)P(x_2 \mid y) \ldots P(x_n \mid y)P(y)}{P(x_1)P(x_2) \ldots P(x_n)}$$

Values for each value of x can be obtained from the dataset derived from attributes, parameters and features of the collected service mesh metrics 513 and substituting them into the equation. For all entries in the dataset, the denominator may not change and thus may remain static. When the denominator is static, it may be removed, and proportionality can be injected, thus resulting in the following equation:

$$P(y \mid x_1, \ldots x_n) \propto P(y) \prod_{i=1}^{n} P(x_i \mid y)$$

Under conditions where a classification using the Naïve Bayes algorithm is multivariate, the class variable (y) may be found with maximum probability using the following equation:

$$y = \mathrm{argmax}_y P(y) \prod_{i=1}^{n} P(x_i \mid y)$$

Posterior probability P(y|X) of API call trends and resource usage trends can be calculated using various inputs into one or more models of the resource usage trend module 547 that are based on the Naïve Bayes algorithm by creating a frequency table for each parameter, attribute, or feature against a provided target. The frequency tables can be molded into likelihood tables for each attribute, feature or parameter, followed by using the Naïve Bayes equation to calculate posterior probability for each class. The class with the highest posterior probability is outputted by the Naïve Bayes algorithm as the API call rate prediction for each capability or function of the microservices for a period of time for the prediction, a prediction of expected increase in API calls over time for each microservice capability or function, and/or expected resource usage as a result of the expected rate or the rate of increase in API calls for the specific capabilities or functions of the microservices 529, 531, 533.

Momentary load increase detector 549 may be responsible for performing tasks or functions of the service mesh 511 associated with detecting and/or identifying momentary increases in resource requirements for the microservices 529, 531, 533 of the service mesh 511 beyond predictable levels of resource requirement increases predicted by the resource usage trend module 547. Embodiments of the momentary load increase detector 549 may scan network traffic entering the service mesh 511 as one or more API calls, check which capabilities or functionalities of the microservices 529, 531, 533 are being called and compare the incoming traffic from one or more application(s) 503 with the predictions outputted by the resource usage trend module 547. If the incoming API calls and/or rate of API calls for one or more capabilities or functions of the microservices 529, 531, 533 are greater than the predicted number of API calls, a predicted rate of API calls within a particular period of time for the prediction, and/or above a threshold level that is greater than the predicted levels of API calls or call rate, the momentary load increase detector 549 may identify an increase in resource requirements for the function or capability of the microservice. For example, the resource usage trend module 547 predicts the number of API calls request a microservice capability to list users at 100 API calls between 10 am to 11 am every day, with a weekly expected increase in API calls for the capability to be 10 additional requests to list user between 10 am to 11 am each week, meaning that after a month, the predicted number of API requests for the microservice capability between 10 am to 11 am every day is 140 list user requests. On a particular day, the momentary load increase detector 549 detects 240 incoming API calls requesting the list user capability, the momentary load increase detector 549 may identify the significant number of API calls for the capability to be a momentary increase in resource requirements because upon comparing the predicted number of API calls for the capability with the incoming API calls, the 240 incoming API calls is above the predicted 100 to 140 API calls that were expected for the list user capability. In response to the momentary increase in resource requirements for a particular microservice capability or function, the momentary load increase detector 549 may signal the presence of the momentary increase in resource requirements to the replica creation and conversion module 553.

Embodiments of the replica creation and conversion module 553 may perform tasks or functions of the service mesh 511 associated with creating sliced replicas 535 of microservices capable of performing specific capabilities or functions of the microservice when momentary increases in resource requirements are identified by the momentary load increase detector 549; convert sliced replicas of microservices 529, 531, 533 to full-scale replicas of a microservice, allowing the newly converted full-scale replica to perform all capabilities or functions of the microservice that was replicated; and/or enable pre-configured cloud functions 557 to perform one or more capabilities or functions of a microservice 529, 531, 533 experiencing a momentary increase in resource requirements. In response to an indication by the momentary load increase detector 549, the replica creation and conversion module 553 may create and configure a sliced replica 535 of one or more microservices 529, 531, 533 to handle the momentary increase in resource requirements, search for and enable one or more pre-configured cloud functions 557 or a combination of approaches thereof during the period of time which the momentary increase in resource requirements occurs.

Embodiments of the replica creation and conversion module 553 may create one or more sliced replicas 535 and configure the sliced replicas 535 to receive a specific type of traffic from application(s) 503 instead of the microservices. More specifically, the sliced replicas 535 can be configured to receive API calls requesting the capabilities or functions of the microservice that are identified as experiencing a momentary increase in resource requirements. Moreover, since the sliced replicas 535 are being created to perform a subset of capabilities of the microservice 529, 531, 533, being replicated, the replica creation and conversion module 553 may provision an amount of computing resources to the sliced replica that is less than the amount of computing resources provisioned to the microservice that is being replicated. During configuration of the sliced replicas 535, dynamic filters can be added which instruct the proxies 537 how to handle incoming traffic to the sliced replica 535. In other words, the dynamic filters can be configured to only allow the proxy 537 to allow incoming API calls for the capability or function of the microservice that the sliced replica is explicitly assigned to handle, while filtering out any remaining API calls requesting other capabilities or functions the full-scale microservice being replicated in a limited fashion would otherwise handle. Moreover, the microservice being replicated in a limited fashion by the sliced replica 535, may also filter API calls for the capabilities or services experiencing the momentary increase in resource requirements. For example, if service 529 experiences a momentary increase in resource requirements for an API call to create new users, replica creation and conversion module 553 creates sliced replica 535 for the limited purpose of fulfilling new user creation. Any API calls to create new users that reach proxy 539 can be routed to proxy 537 which can deliver the request to sliced replica 535. Likewise, any other functions or capabilities that microservice 529 would fulfill such as list user functions or delete user functions can continue to be routed to microservice 529. Any API calls to list user or delete user that are routed to proxy 537 can be filtered out so that they do not reach the microservice of sliced replica 535 and instead are forwarded on to proxy 539 so that service 529 can list user or delete user as requested.

Embodiments of the replica creation and conversion module 553 may, in some situations convert sliced replicas 535 to full-scale replicas of microservices 529, 531, 533 and reconfigure the sliced replica accordingly. For example, upon the momentary load increase detector 549 identifying that a momentary increase in resource requirements for a capability or function of a microservice 529, 531, 533 appears to be a permanent (or semi-permanent) increase in resource requirements based on the continuous amount of API calls for the capability or function over time and/or the continued rate at which the API calls continue to request the capability or function of the microservice 529, 531, 533. In response to the influx of API calls appearing permanent, the replica creation and conversion module 553 may convert the sliced replica 535 into a full-scale replica capable of handling all capabilities and functions of the microservice being replicated. The replica creation and conversion module 553 may reconfigure the sliced replica 535 by provisioning computing resources at least equal to the microservice that is being replicated and may remove any dynamic filters that may have prevented the sliced replica 535 from receiving API calls requesting other capabilities or functions provided by the microservice. Once replicated as a full-scale replica of a microservice, the full-scale replicas may be routed any API calls requesting capabilities or functions of the microservice upon which the full-scale replica was replicated from.

Figure 6:
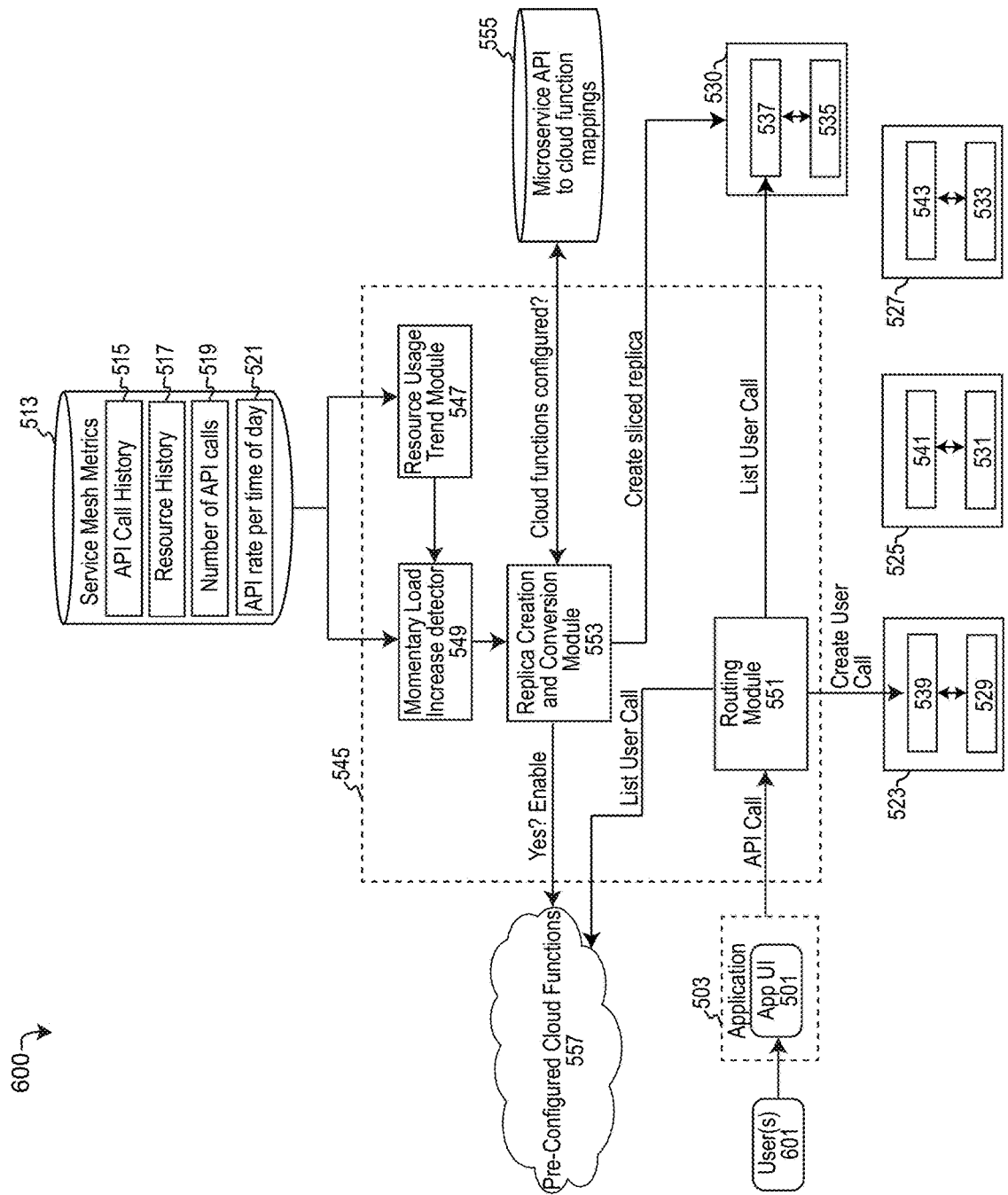
FIG. 6 depicts a workflow diagram describing an embodiment of a service mesh dynamically managing momentary increases in resource requirements of microservice capabilities using a sliced replica or pre-configured cloud functions, in accordance with the present disclosure.

In some embodiments, the replica creation and conversion module 553 may find and enable pre-configured cloud functions 557 that may be used for fulfilling microservice capabilities or functions during a momentary increase in resource requirements. In some embodiments, the pre-configured cloud functions 557 may be used instead sliced replicas 535, alongside sliced replicas 535 and/or prior to creating sliced replicas 535 (i.e., might create a sliced replica 535 if a pre-configured cloud function 557 is not available). A cloud function may refer to a serverless execution environment for building and connecting cloud services. Cloud functions may be written as simple, single-purpose functions that may be attached to events emitted from cloud infrastructure and/or services. The cloud function can be triggered when an event being watched (such as the momentary increase in resource requirements of a microservice capability or function) occurs. The code of the cloud function executes in a fully managed environment without any need to provision infrastructure or manage servers. Available cloud functions that may be executed in response to momentary increases in resource requirements may be mapped API calls for specific microservice capabilities or functions. As shown in FIG. 5 and FIG. 6, the mappings between API calls and cloud functions may be stored in a microservice API to cloud function mapping database 555 (herein cloud function mappings 555).

Embodiments of the replica creation or conversion module 553 and/or administrators of the service mesh 511 may query the cloud function mappings 555 and may pre-configure one or more cloud functions to become enabled when API calls for microservice capabilities or functions are triggered for experiencing momentary increases in resource requirements. Upon triggering a pre-configured cloud function 557 that is mapped to a microservice's API call, API calls for the microservice's capability or function may be routed to the pre-configured cloud function, instead of the microservice 529, 531, 533 that might normally fulfill the request of the API call. Furthermore, when the momentary increase in resource requirements for the API call has subsided back to levels or rates equal to or less than predicted rates or amounts of the API call associated with the pre-configured cloud function, the replica creation and conversion module 553 may disable or disconnect the preconfigured cloud function 557 from handling the specified API calls of the microservice(s), and instead, the API calls that were previously being sent to the pre-configured cloud functions 557 may return to being routed to the microservice themselves and/or full-scale replicas thereof.

Embodiments of the service mesh may include a routing module 551, which may be responsible for receiving incoming traffic such as incoming API calls from Application(s) 503 and route the incoming API calls to the correct microservice 529, 531, 533, sliced replica 535, proxy 537, 539, 541, 543, thereof and/or pre-configured cloud function 557 in accordance with routing rules of the service mesh 511. As noted above, the routing rules for the service mesh 511 may be configured by the service mesh control plane 505 and may be modified or re-configured as momentary increases in resource requirements occur or subside, sliced replicas 535 are created or converted and/or pre-configured cloud functions 557 are enabled or disabled.

FIG. 6 depicts an example 600 of an incoming API call being routed to an appropriate portion of the service mesh 511 for fulfillment of the request in accordance with service mesh 511 routing rules. As shown, A user 601 provides input into an application UI 501 resulting in the application 503 to output an API call to the service mesh requesting a capability or function of the microservices hosted by the service mesh 511. Using the example discussed above, wherein the available calls may request a function such as a create user, list user, or delete user call, the routing module 551 receiving the API Call from the application 503 may route the incoming API call differently depending on the configuration of the service mesh's microservices and whether there is a momentary increase in resource requirements when the API call is received. For instance, if a momentary increase in resource requirements is not identified by the momentary load increase detector 549 based on predictions of the resource usage trend module 547, the incoming API call, for all capabilities or functions may be routed to microservice 529 (or a full-scale replica thereof). Likewise, if a momentary increase in resource requirements for the list user function is identified by the momentary load increase detector 549, the incoming API calls to list user are routed by the routing module 551 to proxy 537 of the sliced replica 535 service, while create user calls and delete user calls are still routed by the routing module 551 to proxy 539 of the microservice 529. Moreover, in a scenario where the replica creation and conversion module has enabled a pre-configured cloud function 557 rather than creating sliced replica 535, routing module 551 would route incoming API calls to list user to the pre-configured cloud function 557 hooked into the service mesh 511 by the replica creation and conversion module 553 instead of having microservice 529 fulfill the request under conditions of a momentary increase in resource requirements. Once momentary increases in resource requirements subside, the pre-configured cloud functions 557 may be disconnected from the service mesh 511 and the routing module 551 may return to routing list user calls to proxy 539 of microservice 529.

Figure 7:
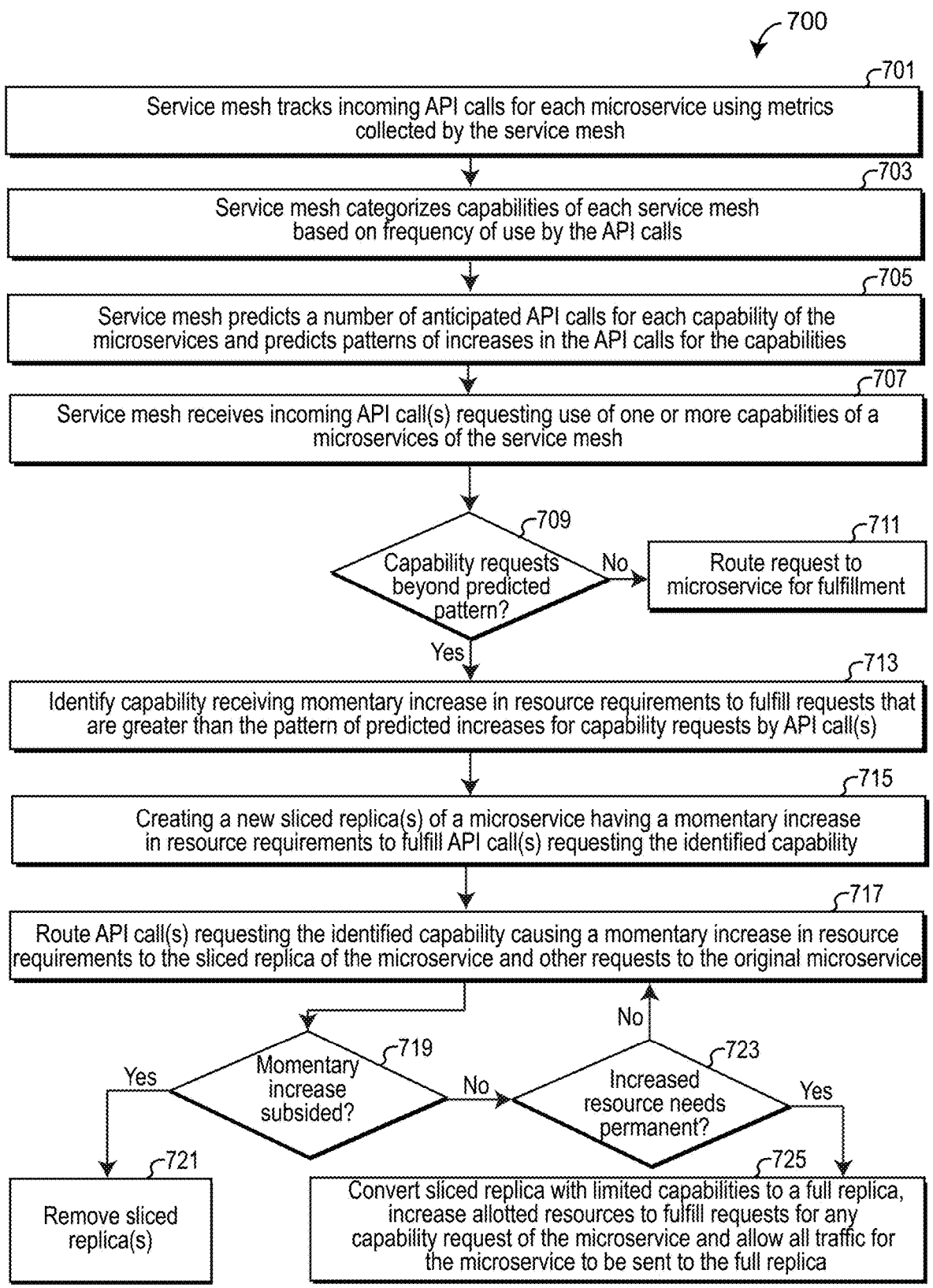
FIG. 7 depicts a flow diagram describing an embodiment of a method for dynamically managing momentary increases in resource requirements of microservice capabilities within a service mesh using a sliced replica in accordance with the present disclosure.
Figure 8A:
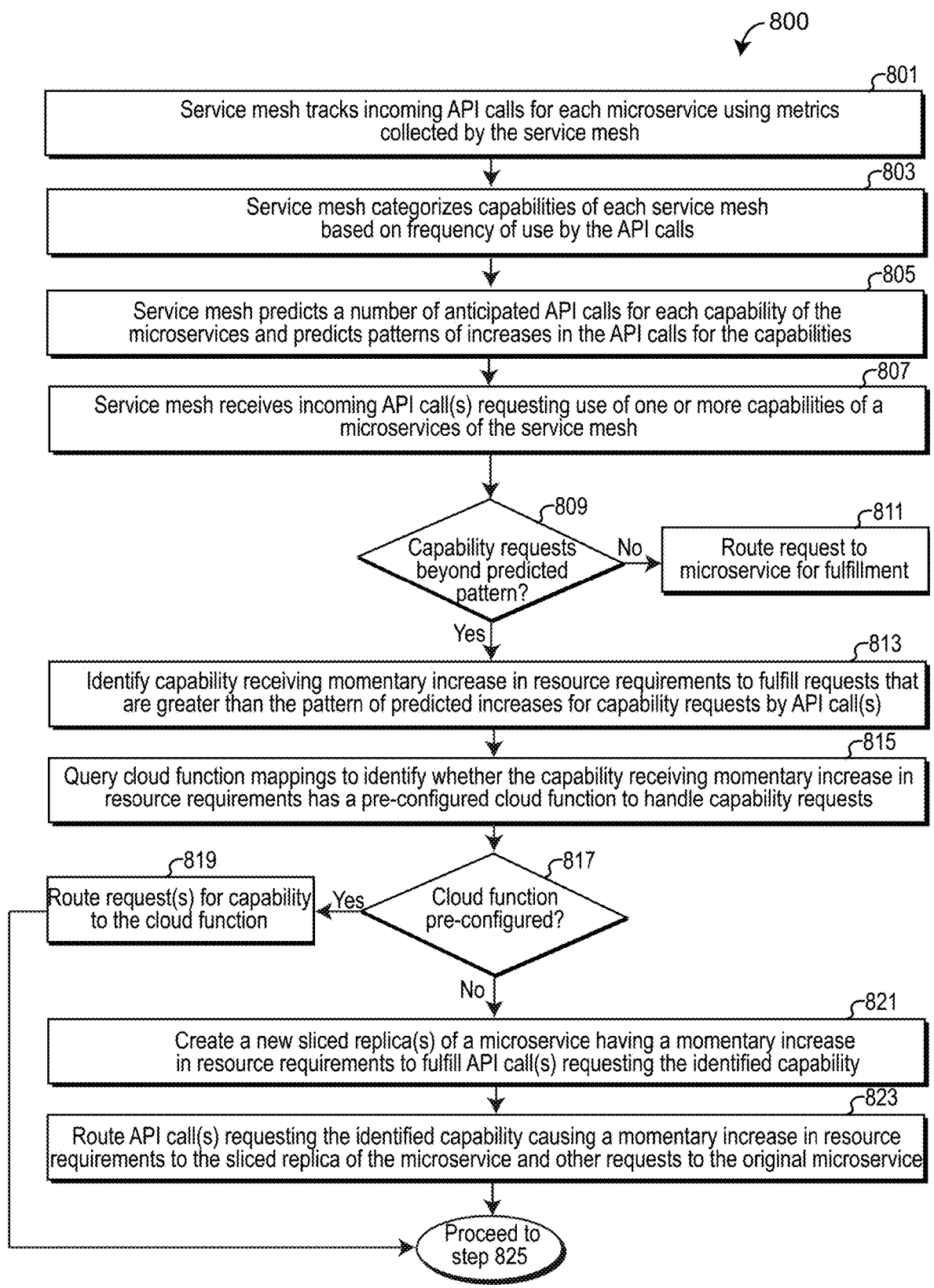
FIG. 8A depicts a flow diagram describing an embodiment of a method for dynamically managing momentary increases in resource requirements of microservice capabilities within a service mesh using a pre-configured cloud function or a sliced replica in accordance with the present disclosure.
Figure 8B:
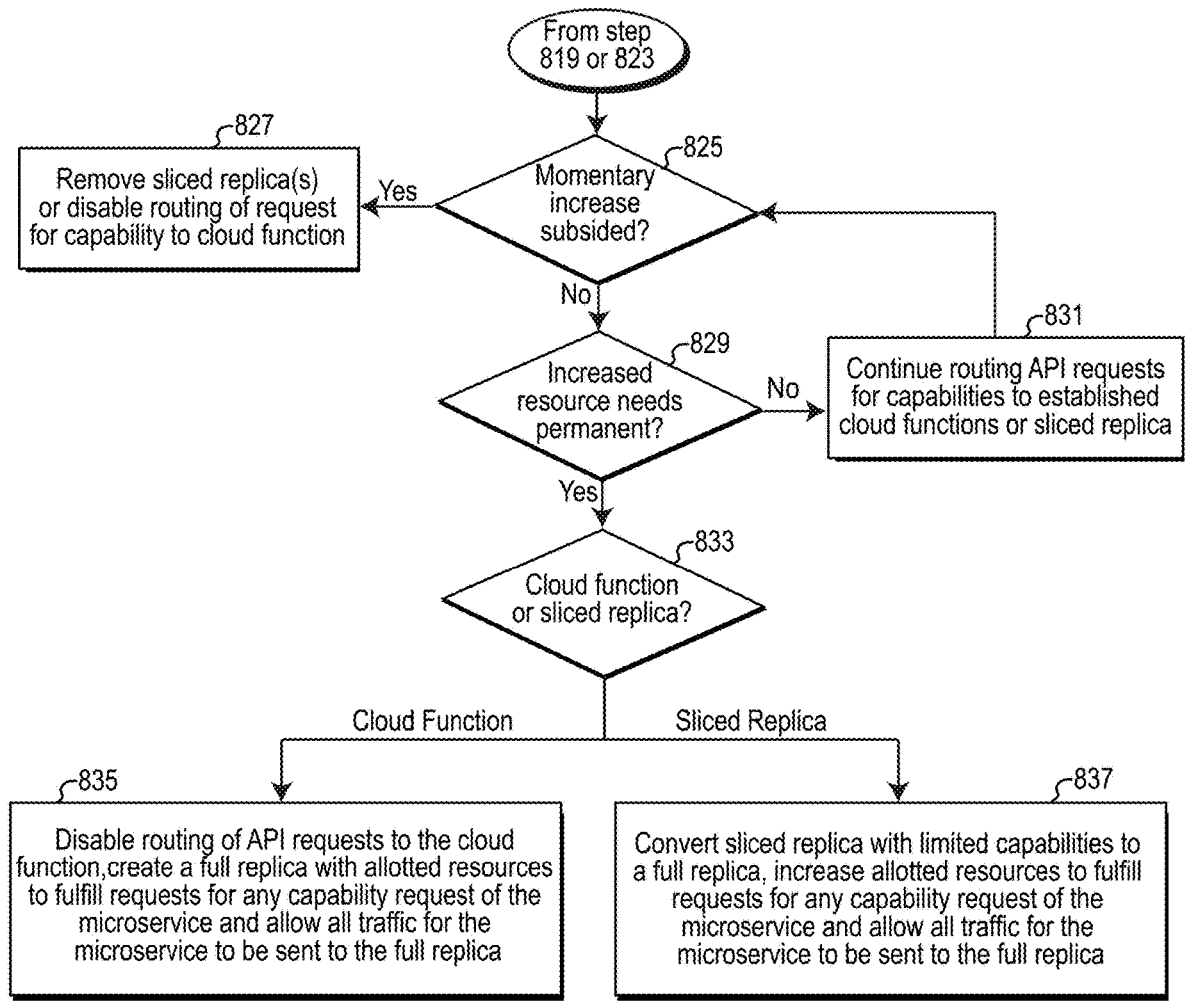
FIG. 8B is a continuation of the flow diagram of FIG. 8A describing the method for dynamically managing momentary increases in resource requirements of microservice capabilities within a service mesh using a pre-configured cloud function or a sliced replica in accordance with the present disclosure.

Method for Managing Momentary Increases in Resource Requirements of Microservices in a Service Mesh The drawings of FIG. 7 and FIGS. 8A-8B represent embodiments of methods for implementing a service mesh 511 capable of dynamically managing momentary increases in resource requirements for capabilities and/or functions of microservices 529, 531, 533 of the service mesh 511, in accordance with FIGS. 3-6 described above, using one or more computing systems defined generically by computing system 100 of FIGS. 1-2; and more specifically by the embodiments of specialized systems depicted in FIGS. 3-6 and as described herein. A person skilled in the art should recognize that the steps of the method described in FIG. 7 and FIGS. 8A-8B may be performed in a different order than presented and may not require all the steps described herein to be performed.

The embodiment of method 700 described by FIG. 7 may begin at step 701. During step 701, a service mesh 511 may track incoming API calls requesting one or more capabilities or functions of microservices 529, 531, 533 of the service mesh 511. The service mesh 511 may store the metrics collected in step 701 to a database or repository; for example, service mesh metrics 513 database. In step 703, the service mesh 511 may categorize the capabilities and/or functions of the microservices 529, 531, 533 being requested by the API calls based on the frequency of each request. For example, capabilities or functions of the microservices 529, 531, 533 requested with a high rate of frequency may be categorized as "frequently used" capabilities, whereas capabilities or functions periodically requested may be categorized as "infrequently used" capabilities, and capabilities or functions of microservices 529, 531, 533 that are hardly ever requested may be categorized by the service mesh 511 as "rarely used" capabilities.

In step 705 of method 700, the service mesh 511 may use the service mesh metrics 513 collected in step 701 and the categorization of the microservices 529, 531, 533 in step 703 to predict an anticipated number of API calls for each capability or function of the microservices 529, 531, 533 for one or more periods of time in the future. Moreover, based on the patterns of the API calls identified using the collected service mesh metrics 513, the service mesh 511 can predict patterns of increases in API calls for each capability or function of each microservice 529, 531, 533 over time. For example, based on patterns of API calls, the service mesh 511 may predict an anticipated number of API calls for each microservice capability or function, and an expected number of increases or decreases in API calls expected for a particular period of time. For example, a predicted rate of increase in API calls next week, next month, 2 months, 6 months, etc., from the prediction date may be generated a resource usage trend module 547.

In step 707 of method 700, the service mesh 511 receives one or more incoming API calls requesting the use of one or more capabilities or services of one or more microservices 529, 531, 533 of the service mesh 511. In step 709, a determination is made (i.e., by the momentary load increase detector 549) whether or not the capabilities or functions of the microservices 529, 531, 533 requested by the one or more API calls incoming in step 707 are greater than the predicted number of API calls for the capability or function of a microservice 529, 531, 533 that was predicted by the service mesh 511 (i.e., by the resource usage trend module 547) in step 705 based on historical patterns of previous API calls. If in step 709, the incoming API calls requesting capabilities or functions of a microservice 529, 531, 533 are not beyond the predicted pattern, or a threshold number of API calls for said capability or function predicted by the service mesh 511, the method 700 may proceed to step 711, wherein the routing module 551 of the service mesh 511 routes the requests of the API calls to the appropriate microservice 529, 531, 533 capable of providing the requested capability or function being requested. Conversely, if in step 709, the API calls requesting the capability or function of the microservice(s) is greater than the predicted number of API calls for said capability or function and/or above a threshold number predicted by the resource usage trend module 547 of the service mesh 511, the method may proceed to step 713.

In step 713, the momentary load increase detector of service mesh 511 may identify the microservice capability or function experiencing a momentary increase in resource requirements due to fulfilling API calls requesting the capability or function of the microservice 529, 531, 533 at a rate greater than the pattern of predicted increases for the microservice's capability. In response to the momentary increase in resource requirements to fill the greater number of API calls than predicted would be received by the microservice 529, 531, 533, the service mesh 511 in step 715 may create one or more new sliced replicas 535 services of the microservice(s) 529, 531, 533 experiencing the momentary increase in resource requirements. The newly created sliced replicas 535 may be implemented by adding dynamic filters to the ingress of network traffic by their proxy 537 in order to limit the type of network traffic being received, to only the API calls requesting the particular capabilities or functions of the microservice 529, 531, 533 that are beyond the levels predicted by the service mesh 511. The sliced replicas 535 may be provisioned a set of computing resources that may be less than the resources provisioned to the original microservices 529, 531, 533 themselves and/or full-scale replicas of the microservice(s) 529, 531, 533.

In step 717 of method 700, the routing module 551 of the service mesh 511 routes API call(s) requesting the capability or function of the microservice(s) 529, 531, 533 causing the momentary increase in resource requirements to the newly created sliced replicas 535 of the microservice, instead of the microservice(s) 529, 531, 533 themselves, while continuing to route any remaining API calls requesting capabilities or functions of the microservice 529, 531, 533 that have not been identified as causing a momentary increase in resource requirements to the microservice 529, 531, 533, and not the sliced replica 535 of the microservice. In step 719, the momentary load increase detector 549 of the service mesh 511 may check whether or not the momentary increase in resource requirements for capabilities or functions of the microservice(s) 529, 531, 533 has subsided back to a level previously predicted by the resource usage trend module 547 of the service mesh 511 and/or below a threshold level considered to no longer be a momentary increase in resource requirements. If the momentary increase in resource requirements has subsided, the method 700 may proceed to step 721. In step 721, upon subsidence of the momentary increase in resource requirements of microservice functions or capabilities previously identified, the replica creation and conversion module 553 of the service mesh 511 may remove the sliced replicas 535 of the microservice from the service mesh 511 and the routing module 551 may return to routing all API calls for the microservices 529, 531, 533 to the requested microservice 529, 531, 533.

If, on the other hand, in step 719, the momentary increase in resource requirements for fulfilling API calls for a capability or function of an identified microservice 529, 531, 533 has not subsided, the method 700 may proceed to step 723. In step 723, the service mesh 511 may further consider whether or not the increased resource requirements of the capabilities or functions of the microservice 529, 531, 533 should be considered a permanent increase in the resource requirement(s) for the microservices 529, 531, 533. For example, the number of API calls for a capability of a microservice 529, 531, 533 continues to remain above the expected number of API calls for a threshold length of time and/or continues to increase beyond the expected number of API calls. If the increase in resource requirements is not observed to be a permanent increase in resource requirements, the sliced replicas 535 of the microservice(s) may continue to remain provisioned and active, and the method 700 may proceed back to step 717, whereby the routing module 551 of the service mesh 511 continues to route API calls for the capabilities or functions of the microservice 529, 531, 533 experiencing the momentary increase in resource requirements to the sliced replicas 535. Moreover, if in step 723, the increase in resource requirements for the capabilities or functions of the identified microservice(s) 529, 531, 533 is seen as a permanent increase, the method may proceed to step 725.

In step 725, upon the conclusion being drawn by the service mesh 511 that the increase in resource requirements appear to be permanent, the replica creation and conversion module 553 of the service mesh 511 may convert the sliced replicas 535 of the microservice(s) with the limited allotment of computing resources to a full-scale replica of the microservice(s) 529, 531, 533. Moreover, as part of the conversion process, the replica creation and conversion module 553 of the service mesh 511 may re-configure the full-scale replica by increasing the provisioned resources to match the number of computing resources provided to the microservice(s) 529, 531, 533 being replicated. The service mesh 511 may further reconfigure the type of network traffic that may be routed to the reconfigured full-scale replica of the microservices 529, 531, 533. Specifically, the service mesh control plane 505 of the service mesh 511 may create or modify routing rules in order to enable routing network traffic to the full-scale replica to fulfill requests for any capability or function of the microservice(s) 529, 531, 533 that is being replicated and allow all traffic that may be sent to the microservice 529, 531, 533 to also be routed to the full-scale replica.

FIGS. 8A-8B describe an alternative embodiment of a method 800 for managing momentary increases in resource requirements of microservices 529, 531, 533 in a service mesh 511, which can include enabling one or more pre-configured cloud functions 557 (when available). Embodiments of method 800 may begin at step 801. During step 801, a service mesh 511 may track incoming API calls requesting one or more capabilities or functions of microservices 529, 531, 533 of the service mesh 511. The service mesh 511 may store the metrics collected in step 801 to a database or repository; for example, service mesh metrics 513 database. In step 803, the service mesh 511 may categorize the capabilities and/or functions of the microservices 529, 531, 533 being requested by the API calls based on the frequency of each request. For example, capabilities or functions of the microservices 529, 531, 533 requested with a high rate of frequency may be categorized as "frequently used" capabilities, whereas capabilities or functions periodically requested may be categorized as "infrequently used" capabilities, and capabilities or functions of microservices 529, 531, 533 that are hardly ever requested may be categorized by the service mesh 511 as "rarely used" capabilities.

In step 805 of method 800, the service mesh 511 may use the service mesh metrics 513 collected in step 801 and the categorization of the microservices 529, 531, 533 in step 803 to predict an anticipated number of API calls for each capability or function of the microservices 529, 531, 533 for one or more periods of time in the future. Moreover, based on the patterns of the API calls identified using the collected service mesh metrics 513, the service mesh 511 can predict patterns of increases in API calls for each capability or function of each microservice 529, 531, 533 over time. For example, based on patterns of API calls, the service mesh 511 may predict an anticipated number of API calls for each microservice capability or function, and an expected number of increases or decreases in API calls expected for a particular period of time. For example, a predicted rate of increase in API calls next week, next month, 2 months, 6 months, etc., from the prediction date may be generated a resource usage trend module 547.

In step 807 of method 800, the service mesh 511 receives one or more incoming API calls requesting the use of one or more capabilities or services of one or more microservices 529, 531, 533 of the service mesh 511. In step 809, a determination is made (i.e., by the momentary load increase detector 549) whether or not the capabilities or functions of the microservices 529, 531, 533 requested by the one or more API calls incoming in step 807 are greater than the predicted number of API calls for the capability or function of a microservice 529, 531, 533 that was predicted by the service mesh 511 (i.e., by the resource usage trend module 547) in step 805 based on historical patterns of previous API calls. If in step 809, the incoming API calls requesting capabilities or functions of a microservice 529, 531, 533 are not beyond the predicted pattern, or a threshold number of API calls for said capability or function predicted by the service mesh 511, the method 800 may proceed to step 811, wherein the routing module 551 of the service mesh 511 routes the requests of the API calls to the appropriate microservice 529, 531, 533 capable of providing the requested capability or function being requested. Conversely, if in step 809, the API calls requesting the capability or function of the microservice(s) 529, 533, 535 is greater than the predicted number of API calls for said capability or function and/or above a threshold number predicted by the resource usage trend module 547 of the service mesh 511, the method may proceed to step 813.

In step 813, the momentary load increase detector of service mesh 511 may identify the microservice capability or function experiencing a momentary increase in resource requirements due to fulfilling API calls requesting the capability or function of the microservice 529, 531, 533 at a rate greater than the pattern of predicted increases for the microservice's capability. In response to the momentary increase in resource requirements to fill the greater number of API calls than predicted would be received by the microservice 529, 531, 533, the replica creation and conversion module 553 of the service mesh 511 in step 815 may query a database or other type of repository containing microservice API to cloud function mappings 555. As part of the query, the replica creation and conversion module 553 of the service mesh 511 may identify whether the capability or function of the microservices 529, 533, 535 experiencing the momentary increase in resource requirements has a pre-configured cloud function 557 mapped to the microservice's API call that could handle requests for the capability or function rather than the microservice 529, 533, 535 itself. In step 817, a determination is made whether or not a cloud function mapped to the incoming API calls for the capability or function of the microservice has been mapped. If a pre-configured cloud function 557 is identified, the method 800 may proceed to step 819, wherein modified routing rules of the service mesh 511 may instruct routing module 551 to route requests for the capability or function of the microservice 529, 533, 535 experiencing the momentary increase in resource requirements to a pre-configured cloud function 557 enabled, and hooked into the service mesh 511 by the replica creation and conversion module 553.

Conversely in step 817 of method 800, if a pre-configured cloud function 557 is not identified as being mapped to the API calls for the microservice capabilities or functions experiencing a momentary increase in resource requirements, the method 800 may proceed to step 821. In step 821, the replica creation and conversion module 553 of the service mesh 511 may create one or more new sliced replicas 535 services of the microservice(s) 529, 531, 533 experiencing the momentary increase in resource requirements. The newly created sliced replicas 535 may be implemented by adding dynamic filters to the ingress of network traffic by their proxy 537 in order to limit the type of network traffic being received, to only the API calls requesting the particular capabilities or functions of the microservice 529, 531, 533 that are beyond the levels predicted by the service mesh 511. The sliced replicas 535 may be provisioned a set of computing resources that may be less than the resources provisioned to the original microservices 529, 531, 533 themselves and/or full-scale replicas of the microservice(s) 529, 531, 533. In step 823 of method 800, the routing module 551 of the service mesh 511 routes API call(s) requesting the capability or function of the microservice(s) 529, 531, 533 causing the momentary increase in resource requirements to the newly created sliced replicas 535 of the microservice, instead of the microservice(s) 529, 531, 533 themselves, while continuing to route any remaining API calls requesting capabilities or functions of the microservice 529, 531, 533 that have not been identified as causing a momentary increase in resource requirements to the microservice 529, 531, 533, and not the sliced replica 535 of the microservice.

In step 825, the momentary load increase detector 549 of the service mesh 511 may check whether or not the momentary increase in resource requirements for capabilities or functions of the microservice(s) 529, 531, 533 has subsided back to a level previously predicted by the resource usage trend module 547 of the service mesh 511 and/or below a threshold level considered to no longer be a momentary increase in resource requirements. If the momentary increase in resource requirements has subsided, the method 800 may proceed to step 827, wherein the replica creation and conversion module 553 of the service mesh 511 may remove the sliced replicas 535 from the service mesh 511 and/or unhook a pre-configured cloud function 557 from the service mesh 511 and disable routing of the API calls to the pre-configured cloud function 557 and/or sliced replica 535. Moreover, the routing rules of the service mesh may be re-configured to route API calls for all microservice capabilities or functions to the microservice 529, 533, 535 instead of the sliced replica 535 and/or pre-configured cloud function(s) 557.

Referring back to step 825, if the momentary increase in resource requirements of the microservice's capability or function has not subsided, the method 800 may proceed to step 829. In step 829, the service mesh 511 may further consider whether or not the increased resource requirements of the capabilities or functions of the microservice 529, 531, 533 should be considered a permanent increase in the resource requirement(s) for the microservices 529, 531, 533. For example, the number of API calls for a capability of a microservice 529, 531, 533 continues to remain above the expected number of API calls for a threshold length of time and/or continues to increase beyond the expected number of API calls. If the increase in resource requirements is not observed to be a permanent increase in resource requirements, the method 800 may proceed to step 831. During step 831, the pre-configured cloud functions 557 and/or sliced replicas 535 of the microservice(s) may continue to remain active, and the routing module 551 continues to route API calls requesting the capability or function experiencing the momentary increase in resource requirements to the sliced replica 535 and/or pre-configured cloud function(s) 557. Conversely, if in step 829, the increase in resource requirements for the capabilities or functions of the identified microservice(s) 529, 531, 533 is seen as a permanent increase, the method may proceed to step 833.

In step 833, a determination may be made by the service mesh 511 whether in response to the momentary increase in resource requirements, the service mesh created sliced replicas 535 or enabled pre-configured cloud functions 557 to fulfill requests for the capabilities or functions of the microservices 529, 531, 533. If a pre-configured cloud function 557 was mapped to the API calls and enabled by the service mesh 511, the method 800 may proceed to step 835. Otherwise, if the service mesh 511 created one or more sliced replicas 535, the method 800 may proceed to step 837. In step 835, in response to the momentary increase in resource requirements of the microservice(s) 529, 531, 533 being considered a permanent increase, the service mesh 511 may disable routing of the API calls requesting the capability or function of the microservice to the pre-configured cloud function(s) 557. The replica creation and conversion module 553 may create a full-scale replica of the microservice and configured the full-scale replica with an increase in provisioned resources that may be equal to the computing resources of the microservice being replicated by the full-scale replica. Routing rules may be updated to allow the newly created full-scale replica to receive any API calls that would otherwise have been routed to the microservice being replicated by the full-scale replica, and incoming API calls for the microservice 529, 531, 533 may be routed by the routing module 551 to the full-scale replica.

In step 837 of method 800, in response to the momentary increase in resource requirements of the microservice(s) 529, 531, 533 being considered a permanent increase, the replica creation and conversion module 553 of the service mesh 511 may convert the sliced replica 535 with limited capabilities to a full-scale replica of the microservice. The newly converted full-scale replica of the microservice can be configured with an increase in provisioned computing resources that may be equal to the computing resources of the microservice being replicated by the full-scale replica. Routing rules may be updated to allow the newly converted full-scale replica to receive any API calls that would otherwise have been routed to the microservice being replicated by the full-scale replica, and incoming API calls for the microservice 529, 531, 533 may be routed by the routing module 551 to the newly converted full-scale replica.

What is claimed is:

1. A computer-implemented method for managing momentary increases in resource requirements of microservice capabilities within a service mesh, the computer-implemented method comprising:

tracking, by the service mesh, incoming application programming interface (API) calls to one or more microservices of the service mesh;

predicting, by the service mesh, based on the incoming API calls being tracked, a number of expected requests for capabilities of each microservice and a pattern describing an expected increases in the requests for the microservice capabilities over time;

checking, by the service mesh, the resource requirements of the microservice capabilities and as a result of checking the resource requirements of the microservice capabilities, identifying, by the service mesh, a capability of a microservice experiencing a momentary increase in resource requirements above the pattern describing the expected increases; and routing, by the service mesh, the incoming API calls requesting the capability of the microservice experiencing the momentary increase in resource requirements to a sliced replica of the microservice accepting only requests for the capability experiencing the momentary increase in resource requirements or a pre-configured cloud function performing the capability of the microservice experiencing the momentary increase in resource requirements.

2. The computer-implemented method of claim 1, further comprising:

creating, by the service mesh, the sliced replica of the microservice experiencing the momentary increase in the resource requirements above the pattern describing the expected increases;

allotting, by the service mesh, computing resources to the sliced replica, wherein the sliced replica of the microservice accepting only requests for the capability experiencing the momentary increase in resource requirements is allotted fewer computing resources than full-scale replicas of the microservice; and routing, by the service mesh the incoming API calls requesting the capability of the microservice to the sliced replica.

3. The computer-implemented method of claim 1, further comprising:

observing, by the service mesh, a reduction in the momentary increase in the resource requirements below a threshold level, said threshold level being within the pattern describing the expected increases in the requests for the microservice capabilities over time;

in response to the reduction of resource requirements below the threshold level, removing, the sliced replica; and routing, by the service mesh, the incoming API calls requesting capabilities of the microservice to the microservice, including capabilities previously routed only to the sliced replica of the microservice.

4. The computer-implemented method of claim 1, further comprising:

observing, by the service mesh, the capability of a microservice experiencing a momentary increase in the resource requirements above the pattern describing the expected increases is a permanent increase in the resource requirements; and converting, by the service mesh, the sliced replica of the microservice accepting only requests for the capability experiencing the momentary increase in resource requirements to a full-scale replica of the microservice, wherein the full-scale replica accepts any traffic of the incoming API to the microservice being replicated.

5. The computer-implemented method of claim 1 further comprising:

querying, by the service mesh, a cloud function mapping for the pre-configured cloud function mapped to the capability of the microservice experiencing the momentary increase in resource requirements;

enabling, by the service mesh, the pre-configured cloud function mapped to the capability of the microservice experiencing a momentary increase in resource requirements; and for the incoming API calls requesting the capability of the microservice experiencing the momentary increase in resource requirements, routing, by the service mesh, the API calls to the pre-configured cloud function instead of the micro service experiencing the momentary increase in resource requirements.

6. The computer-implemented method of claim 1, further comprising:
observing, by the service mesh, a reduction in the momentary increase in the resource requirements below a threshold level, said threshold level being within the pattern describing the expected increases in the requests for the microservice capabilities over time;
in response to the reduction of resource requirements below the threshold level, disabling, by the service mesh, the pre-configured cloud function; and
routing, by the service mesh, incoming API calls requesting capabilities of the microservice, including capabilities previously routed to the pre-configured cloud function to the microservice.

7. The computer-implemented method of claim 1, further comprising:
observing, by the service mesh, the capability of the microservice experiencing the momentary increase in the resource requirements above the pattern describing the expected increases is a permanent increase in the resource requirements;
creating, by the service mesh, a full-scale replica of the microservice experiencing the momentary increase in the resource requirements, wherein the full-scale replica accepts any traffic of the incoming API to the microservice being replicated; and
disabling, by the service mesh, routing of the incoming API calls requesting the capability of the microservice experiencing the momentary increase in resource requirements to the pre-configured cloud function.

8. A computing program product for managing momentary increases in resource requirements of microservice capabilities within a service mesh comprising:
one or more computer readable storage media having computer-readable program instructions stored on the one or more computer readable storage media, said program instructions executes a computer-implemented method comprising:
tracking, by the service mesh, incoming application programming interface (API) calls to one or more microservices of the service mesh;
predicting, by the service mesh, based on the incoming API calls being tracked, a number of expected requests for capabilities of each microservice and a pattern describing an expected increases in the requests for the microservice capabilities over time;
checking, by the service mesh, the resource requirements of the microservice capabilities and as a result of checking the resource requirements of the microservice capabilities, identifying, by the service mesh, a capability of a microservice experiencing a momentary increase in resource requirements above the pattern describing the expected increases; and
routing, by the service mesh, the incoming API calls requesting the capability of the microservice experiencing the momentary increase in resource requirements to a sliced replica of the microservice accepting only requests for the capability experiencing the momentary increase in resource requirements or a pre-configured cloud function performing the capability of the microservice experiencing the momentary increase in resource requirements.

9. The computing program product of claim 8, further comprising:
creating, by the service mesh, the sliced replica of the microservice experiencing the momentary increase in the resource requirements above the pattern describing the expected increases;
allotting, by the service mesh, computing resources to the sliced replica, wherein the sliced replica of the microservice accepting only requests for the capability experiencing the momentary increase in resource requirements is allotted fewer computing resources than full-scale replicas of the microservice; and
routing, by the service mesh the incoming API calls requesting the capability of the microservice to the sliced replica.

10. The computing program product of claim 8, further comprising:
observing, by the service mesh, a reduction in the momentary increase in the resource requirements below a threshold level, said threshold level being within the pattern describing the expected increases in the requests for the microservice capabilities over time;
in response to the reduction of resource requirements below the threshold level, removing, the sliced replica; and
routing, by the service mesh, the incoming API calls requesting capabilities of the microservice to the microservice, including capabilities previously routed only to the sliced replica of the microservice.

11. The computing program product of claim 8 further comprising:
observing, by the service mesh, the capability of a microservice experiencing the momentary increase in the resource requirements above the pattern describing the expected increases is a permanent increase in the resource requirements; and
converting, by the service mesh, the sliced replica of the microservice accepting only requests for the capability experiencing the momentary increase in resource requirements to a full-scale replica of the microservice, wherein the full-scale replica accepts any traffic of the incoming API calls to the microservice being replicated.

12. The computing program product of claim 8, further comprising:
querying, by the service mesh, a cloud function mapping for the pre-configured cloud function mapped to the capability of the microservice experiencing the momentary increase in resource requirements;
enabling, by the service mesh, the pre-configured cloud function mapped to the capability of the microservice experiencing a momentary increase in resource requirements; and
for the incoming API calls requesting the capability of the microservice experiencing the momentary increase in resource requirements, routing, by the service mesh, the API calls to the pre-configured cloud function instead of the micro service experiencing the momentary increase in resource requirements.

13. The computing program product of claim 8, further comprising:
observing, by the service mesh, a reduction in the momentary increase in the resource requirements below a threshold level, said threshold level being within the pattern describing the expected increases in the requests for the microservice capabilities over time;

in response to the reduction of resource requirements below the threshold level, disabling, by the service mesh, the pre-configured cloud function; and routing, by the service mesh, incoming API calls requesting capabilities of the microservice, including capabilities previously routed to the pre-configured cloud function to the microservice.

14. The computing program product of claim 8, further comprising:

observing, by the service mesh, the capability of a microservice experiencing the momentary increase in the resource requirements above the pattern describing the expected increases is a permanent increase in the resource requirements;

creating, by the service mesh, a full-scale replica of the microservice experiencing the momentary increase in the resource requirements, wherein the full-scale replica accepts any traffic of the incoming API to the microservice being replicated; and disabling, by the service mesh, routing of the incoming API calls requesting the capability of the microservice experiencing the momentary increase in resource requirements to the pre-configured cloud function.

15. A computer system for managing momentary increases in resource requirements of microservice capabilities within a service mesh comprising:

a processor; and a computer-readable storage media coupled to the processor, wherein the computer-readable storage media contains program instructions executing, via the processor, a computer-implemented method comprising:

tracking, by the service mesh, incoming application programming interface (API) calls to one or more microservices of the service mesh;

predicting, by the service mesh, based on the incoming API calls being tracked, a number of expected requests for capabilities of each microservice and a pattern describing an expected increases in the requests for the microservice capabilities over time;

checking, by the service mesh, the resource requirements of the microservice capabilities and as a result of checking the resource requirements of the microservice capabilities, identifying, by the service mesh, a capability of a microservice experiencing a momentary increase in resource requirements above the pattern describing the expected increases; and routing, by the service mesh, the incoming API calls requesting the capability of the microservice experiencing the momentary increase in resource requirements to a sliced replica of the microservice accepting only requests for the capability experiencing the momentary increase in resource requirements or a pre-configured cloud function performing the capability of the microservice experiencing the momentary increase in resource requirements.

16. The computer system of claim 15, further comprising:

creating, by the service mesh, the sliced replica of the microservice experiencing the momentary increase in the resource requirements above the pattern describing the expected increases;

allotting, by the service mesh, computing resources to the sliced replica, wherein the sliced replica of the microservice accepting only requests for the capability experiencing the momentary increase in resource requirements is allotted fewer computing resources than full-scale replicas of the microservice; and routing, by the service mesh the incoming API calls requesting the capability of the microservice to the sliced replica.

17. The computer system of claim 15, further comprising:

observing, by the service mesh, a reduction in the momentary increase in the resource requirements below a threshold level, said threshold level being within the pattern describing the expected increases in the requests for the microservice capabilities over time;

in response to the reduction of resource requirements below the threshold level, removing the sliced replica; and routing, by the service mesh, the incoming API calls requesting capabilities of the microservice to the microservice, including capabilities previously routed only to the sliced replica of the microservice.

18. The computer system of claim 15, further comprising:

observing, by the service mesh, the capability of a microservice experiencing the momentary increase in the resource requirements above the pattern describing the expected increases is a permanent increase in the resource requirements; and converting, by the service mesh, the sliced replica of the microservice accepting only requests for the capability experiencing the momentary increase in resource requirements to a full-scale replica of the microservice, wherein the full-scale replica accepts any traffic of the incoming API to the microservice being replicated.

19. The computer system of claim 15, further comprising:

querying, by the service mesh, a cloud function mapping for the pre-configured cloud function mapped to the capability of the microservice experiencing the momentary increase in resource requirements;

enabling, by the service mesh, the pre-configured cloud function mapped to the capability of the microservice experiencing a momentary increase in resource requirements; and for the incoming API calls requesting the capability of the microservice experiencing the momentary increase in resource requirements, routing, by the service mesh, the API calls to the pre-configured cloud function instead of the micro service experiencing the momentary increase in resource requirements.

20. The computer system of claim 15, further comprising:

observing, by the service mesh, the capability of a microservice experiencing the momentary increase in the resource requirements above the pattern describing the expected increases is a permanent increase in the resource requirements;

creating, by the service mesh, a full-scale replica of the microservice experiencing the momentary increase in the resource requirements, wherein the full-scale replica accepts any traffic of the incoming API to the microservice being replicated; and disabling, by the service mesh, routing of the incoming API calls requesting the capability of the microservice experiencing the momentary increase in resource requirements to the pre-configured cloud function.

\* \* \* \* \*